(12) United States Patent
Chen et al.

(10) Patent No.: US 10,778,050 B2
(45) Date of Patent: Sep. 15, 2020

(54) DC GENERATOR WITHOUT REVERSING

(71) Applicant: Ziwei Chen, Beijing (CN)

(72) Inventors: Ziwei Chen, Beijing (CN); Shihao Chen, Changchun (CN); Yunpeng Jiang, Changchun (CN)

( * ) Notice: Subject to any disclaimer, the term of this patent is extended or adjusted under 35 U.S.C. 154(b) by 306 days.

(21) Appl. No.: 15/993,770

(22) Filed: May 31, 2018

(65) Prior Publication Data
US 2018/0351422 A1 Dec. 6, 2018

(30) Foreign Application Priority Data

Jun. 1, 2017 (CN) .......................... 2017 1 0430183

(51) Int. Cl.
*H02K 1/22* (2006.01)
*H02K 35/02* (2006.01)
(Continued)

(52) U.S. Cl.
CPC ................. *H02K 1/22* (2013.01); *H02K 1/27* (2013.01); *H02K 1/2793* (2013.01); *H02K 35/02* (2013.01);
(Continued)

(58) Field of Classification Search
CPC .......... H02K 1/182; H02K 1/187; H02K 1/22; H02K 1/27; H02K 1/2793; H02K 35/02; H02K 2213/00; H02K 2213/03
(Continued)

(56) References Cited

U.S. PATENT DOCUMENTS

| 2,279,690 A * | 4/1942 | Lindsey ................. H02K 25/00 |
| | | 310/46 |
| 6,794,783 B2 * | 9/2004 | Tu ........................... H02K 3/04 |
| | | 310/156.32 |

(Continued)

*Primary Examiner* — Tulsidas C Patel
*Assistant Examiner* — Rashad H Johnson

(57) ABSTRACT

A DC generator without reversing, belonging to the electromechanical field. The main elements are: ring-shaped magnets of which the magnetic field direction is perpendicular to the ring surfaces or along the radial direction of the ring surfaces, a magnetic conductive plate or magnetic conductive tube which is made of high permeability magnetic material, provided with holes through which a conducting wire can pass, has a surface completely insulated from the rest part, and has high resistance or is insulated, a conducting wire coil provided with an insulation layer on the surface and twined around the conducting wire frame through the holes of the magnetic conductive plate, and drive wheels at the same angular velocity; the conducting wire, and the magnetic conductive plate or magnetic conductive tube are installed between the magnets or one the end surfaces, and the two ends of the conducting wire are directly connected to the wiring posts or are connected by an electric brush; driven by power, the magnets and the conducting wire perform relative motion which makes the conducting wire cut magnetic lines of force, and DC electromotive force is generated; or the magnetic conductive plate or magnetic conductive tube is not used, but two groups of serial conducting wires or conducting strips move in opposite directions or perform relative motion of cutting the magnetic line of force between the magnets having opposite magnetic field directions. Such generator generates DC electromotive force without reversing; and has simple structure, low cost and long life.

14 Claims, 13 Drawing Sheets

(51) Int. Cl.
    *H02K 1/27* (2006.01)
    *H02K 1/18* (2006.01)
(52) U.S. Cl.
    CPC ............. *H02K 1/182* (2013.01); *H02K 1/187* (2013.01); *H02K 2213/00* (2013.01); *H02K 2213/03* (2013.01)
(58) Field of Classification Search
    USPC .......... 310/67 A, 75 R, 139, 154.05, 154.06, 310/156.32, 177, 179, 180, 181, 184, 185
    See application file for complete search history.

(56) References Cited

U.S. PATENT DOCUMENTS

| | | | | |
|---|---|---|---|---|
| 2005/0029900 | A1* | 2/2005 | Hiramatsu | H02K 21/145 310/268 |
| 2008/0100164 | A1* | 5/2008 | Okazaki | H02K 55/02 310/154.01 |
| 2008/0265816 | A1* | 10/2008 | Takeuchi | B60L 15/20 318/400.04 |
| 2010/0187934 | A1* | 7/2010 | Asano | F04C 15/008 310/156.32 |
| 2010/0277025 | A1* | 11/2010 | Doi | H02K 21/24 310/156.12 |
| 2010/0289350 | A1* | 11/2010 | Watanabe | H02K 3/522 310/63 |

* cited by examiner

DC GENERATOR WITHOUT REVERSING

TECHNICAL FIELD

A DC generator without reversing belongs to the electromechanical field.

BACKGROUND

So far, there have been two types of DC generators and motors, all of which must have a reversing device. One type is to use an electric brush to reverse, and the other type is to use a semiconductor switch element to reverse. The former has simple structure, low cost, fast wearing of electric brush, and short life; while the latter has complex structure, high cost and long life.

The aim of the present invention is to realize a DC generator and motor without any reversing element, which has simple structure, low cost and long life.

SUMMARY

The present invention, a DC generator without reversing, has a plurality of forms which are commonly characterized in that the main elements are ring-shaped magnets of which the field direction is perpendicular to the ring surfaces or along the radial direction of the ring surfaces, a magnetic conductive plate or magnetic conductive tube which is made of high permeability magnetic material, provided with holes through which a conducting wire can pass, has a surface completely insulated from the rest part, and has high resistance or is insulated, a conducting wire of which the surface is provided with an insulation layer, drive wheels, a center shaft $A_M$ and a relative slide device; the structure and working process are that the vertical center lines of the magnet ring surface and the magnetic conductive plate coincide with the axis of $A_M$, the conducting wire is between the magnets or around the magnets, the magnetic conductive plate or magnetic conductive tube is between, or on the side surfaces or on the end surfaces of the magnets, the conducting wire passes through the holes of the magnetic conductive plate or magnetic conductive tube and twines into a coil, both ends of the conducting wire are connected to wiring posts directly or through electric brushes or conducting slip rings, and the drive wheels are used, so that the angular velocity of rotation of each magnet is identical; driven by power, the magnets and the conducting wire perform relative motion which makes the conducting wire cut magnetic lines of force, and DC electromotive force is generated due to Lorentz force; or the magnetic conductive plate or magnetic conductive tube is not used, but two groups of conducting wires or conducting strips move in opposite directions; pure iron, permeability alloy, silicon steel sheet, ferrite, Nd—Fe—B alloy or iron alloy is used as high permeability magnetic material for making the magnetic conductive plate or the magnetic conductive tube; and the permeability magnetic material has high resistance or is insulated, or is added with an insulation layer in a direction perpendicular to the induced current to make the magnetic conductive plate or the magnetic conductive tube insulated.

As a result that the magnetic lines of force are cut or the magnetic field is changed, the magnetic conductive plate will also generate electromotive force. The magnetic conductive plate must be completely insulated from the rest part of the generator in order not to offset the electromotive force generated by the rest part of the wire, and not to generate a current due to the change of magnetic field on the other hand. Therefore, the magnetic conductive plate needs to have very high internal resistance or be insulated. A magnetic conductive plate with very high internal resistance can be used directly. For pure iron and the like, an insulation film can be added in the direction of the generated current. The main function of the magnetic conductive plate is to change the magnetic circuit, so that the conducting wire in the holes thereof can be significantly less affected or not affected by the magnetic field.

The first form of such generator is as follows (FIG. 1): for each of two identical ring-shaped magnets $M_A$ and $M_B$, the magnetic field direction thereof is perpendicular to the ring surface, the vertical cross section of the ring is rectangular, the thickness, inner ring radius and outer ring radius are $h_M$, $r_M$ and $R_M$ respectively, N, S magnetic poles of $M_A$ and $M_B$ are opposite, the distance is $d_{AB}$, the vertical center lines of ring surfaces of the $M_A$ and $M_B$, coincide, and $M_A$ and $M_B$ are fixed to a rotating arm of the center shaft $A_M$;

the magnetic conductive plate $F_L$ of such generator is identical to the ring surface of each magnet, the thickness is $h_F$, n holes through which a conducting wire can pass are drilled in $F_L$ in the radial direction; on the two opposite ring surfaces of the magnetic conductive plate $F_L$, ring plates or frames $P_F$, which are made of non-magnetic conductive insulation material, are identical to the ring surface of $F_L$ and have the thickness of $h_N$ are respectively fixed, and $F_L$ and $P_F$ are combined into a whole $F_L$-$P_F$; suppose the opening of the inner ring is the inlet of the conducting wire, and the opening of the outer ring is the outlet of the conducting wire; the conducting wire passes through the n holes and twines around $F_L$-$P_F$, i.e., one end of the conducting wire is fixed on a wiring post 1 outside the large ring, and the other end comes from the outside of the magnetic conductive plate $F_L$ to the inlet of hole 1, passes through hole 1, comes from the outside of the magnetic conductive plate $F_L$ to the inlet of hole 2, passes through hole 2, comes from the outside of the magnetic conductive plate $F_L$ to the inlet of hole 3, and so on, until this end comes out from hole n; this process may be repeated for many times according to needs, or the conducting wire is made to pass through one hole repeatedly for several times and then pass through the next hole, or a plurality of conducting wires are made to enter the inlet of hole 1 and finally come out from the outlet of hole n, and then the conducting wire coming out from the outlet of n is connected to wiring post 2; the $F_L$-$P_F$ around which the conducting wire twines is installed between magnets $M_A$ and $M_B$, so that the vertical center line of $F_L$-$P_F$ coincides with that of the ring surface of the magnet, and $F_L$-$P_F$ is fixed onto a bracket $P_C$, and $P_C$ is fixed onto a bottom plate P of the generator;

when $A_M$ is driven to rotate by power at an angular velocity ω, magnets $M_A$ and $M_B$ will rotate along with $A_M$ at an angular velocity ω, the stationary conducting wire moves relatively to the magnets to cut magnetic lines of force, the conducting wire outside the magnetic conductive plate generates electromotive force, but the conducting wire at the hole of $F_L$ does not generate or generates a small reverse electromotive force, which is because that the magnetic circuit of the hole area is changed by the magnetic conductive plate holes, and the magnetic field in the holes is very weak and can be ignored; as each section of the conducting wire is connected in series with another section, the DC electromotive force is deduced by the law of electromagnetic induction, $$V_T = nkB(R_M - r_M)[(R_M + r_M)/2]\omega = (1/2)nkB\omega(R_M^2 - r_M^2) = (1/2)nk_1 B\omega S_M, \quad (1)$$

wherein $k_1=k/\pi$ is the scale factor of the first type of DC generator, and B is the effective magnetic induction intensity; no electric brush is needed in this case; it should be pointed out that as the magnetic conductive plate is stationary relative to the conducting wire, the conducting wire does not cut the magnetic conductive plate to generate magnetic field, and therefore the effective magnetic induction intensity of formula (1) is codetermined by the magnets $M_A$, $M_B$ and the magnetic conductive plate $F_L$. Secondly, each part of the conducting wire loop may cut magnetic lines of force, but formula (1) only shows the electromotive force generated by the conducting wire on the surface of the ring plates by cutting magnetic lines of force, and the electromotive force generated by other parts has a different value and opposite sign compared with formula (1). The total electromotive force is the sum of the electromotive force generated by each part of the conducting wire loop. The function of the ring plate $P_F$ fixed on the magnetic conductive plate is to increase the distance between the conducting wire and the magnetic conductive plate, thus reducing the influence of the magnetic conductive plate on the external conducting wire.

The other mode of such generator is as follows: the magnets are stationary and fixed onto a bracket $P_C$, and the magnetic conductive plate around which the conducting wire twines is fixed onto a rotating arm; when $A_M$ is driven to rotate reversely by power at an angular velocity ω, electromotive force $V_T$ which is identical to that of formula (1) is generated; at this moment, an electric brush is needed to connect the two ends of the conducting wire respectively with the conducting slip rings 1 and 2;

the magnetic conductive plate with holes may not be used, and the conducting wire passing through the holes of the magnetic conductive plate is made to pass through the magnetic conductive tube or coated with high permeability magnetic material in order to change the magnetic circuit and reduce the effect of magnetic field on this part of conducting wire;

the other mode of the magnet of such generator is as follows: only one ring-shaped magnet of which the field direction is perpendicular to the ring surface is used, and correspondingly, a ring plate $P_F$ is fixed on only one side of the magnetic conductive plate; and the ring plate $P_F$ is close to the magnet. The conducting wire and the installation mode of $F_L$-$P_F$ are identical to that above.

The ring plate $P_N$ can be made of many kinds of non-magnetic conductive insulation material, such as wood and plastic.

The second form of such generator is as follows: the arrangement mode of the magnets is identical to that of the first form, conductors are conducting strips identical to the ring surfaces of the magnets, and the conducting strips are connected by the conducting wires in the magnetic conductive tube or the conducting wires coated with high permeability magnetic material;

the specific structure is as follows (FIG. 2): a conductor loop consists of n conducting strips $D_j$, j=1, 2 . . . n which are identical to the ring surfaces of the magnets, are provided with insulation films on the surfaces and have the thickness of $h_D$, and n conducting wires which connect these conducting strips, are encapsulated in the magnetic conductive tube, and are provided with insulation films on the surfaces; these conducting strips are arranged to make the vertical center lines thereof coincide with the vertical center lines of the magnets and uniformly arranged between the magnets $M_A$ and $M_B$; the outer circle edge of the first conducting strip is connected with a wiring post 1, the inner circle edge thereof is connected with the outer circle edge of the second conducting strip by the first conducting wire encapsulated in the magnetic conductive tube, the inner circle edge of the second conducting strip is connected with the outer circle edge of the third conducting strip by the second conducting wire encapsulated in the magnetic conductive tube, and so on, the inner circle edge of the $(n-1)^{th}$ conducting strip is connected with the outer circle edge of the $n^{th}$ conducting strip by the $(n-1)^{th}$ conducting wire encapsulated in the magnetic conductive tube, and the inner circle edge of the $n^{th}$ conducting strip is connected with a wiring post 2 by the $n^{th}$ conducting wire encapsulated in the magnetic conductive tube;

the magnets $M_A$ and $M_B$ are fixed onto a rotating arm, and the conducting strips are fixed onto a bottom plate; or n conducting strips are fixed onto a rotating arm, and the magnets are fixed onto a bottom plate; in the former case, when $A_M$ is driven to rotate by power at an angular velocity ω, $M_A$ and $M_B$ will rotate along with $A_M$ at an angular velocity ω, the conducting strips are stationary, and no electric brush is needed; in the latter case, when $A_M$ is driven to rotate reversely by power at an angular velocity ω, magnets $M_A$ and $M_B$ are stationary, the group of conducting strips will rotate reversely along with $A_M$ at an angular velocity ω, and the outer circle edge of the first conducting strip and the outer circle edge of the $n^{th}$ conducting strip need to be connected respectively with conducting slip rings 1 and 2 through electric brushes at this moment; in both cases, the n conducting strips perform the identical motion of cutting magnetic lines of force, but the n conducting wires which connect the conducting strips and are encapsulated in the magnetic conductive tube does not cut magnetic lines of force; in this way, identical DC electromotive force $V_T$ is generated between the wiring posts 1 and 2 or between the conducting slip rings 1 and 2, the difference of magnetic induction intensity acting on different conducting strips is ignored, and the electromotive force $V_T$ is described by formula (1), wherein the scale factor is changed into $k_2$.

When external force does identical work, the differences in the electromotive force and power supply internal resistance generated by the conducting strips and the conducting wires are that: the electromotive force and internal resistance generated by the conducting strips are small, and the current is high; the electromotive force and internal resistance generated by the conducting wires are large, and the current is low.

The third form of such generator is as follows: the ring-shaped magnets are stationary, and the ring-shaped conducting strips perpendicular to the magnetic field rotate in the opposite direction; the specific structure is as follows (FIG. 3): $M_A$ and $M_B$ are fixed onto a bracket thereof; the conductor loop consists of 2n conducting strips $D_j$, j=1, 2 . . . 2n which are identical to the ring surfaces of the magnets, and conducting wires which connect these conducting strips; these conducting strips are arranged to make the vertical center lines thereof coincide with the vertical center lines of the magnets and uniformly arranged between the magnets $M_A$ and $M_B$, the distance between every two vertical center lines is $d_D$, the outer circle edge of the first conducting strip is connected with a conducting slip ring 1 by a conducting brush, the inner circle edge thereof is connected with the inner circle edge of the second conducting strip by a conducting brush, the outer circle edge of the second conducting strip is connected with the outer circle edge of the third conducting strip by a conducting brush, the inner circle edge of the third conducting strip is connected with the inner circle edge of the fourth conducting strip by a conducting brush, and so on, the inner circle edge of the (2n−1)$^{th}$ conducting strip is connected with the inner circle edge of the 2n$^{th}$ conducting strip by a conducting brush, and the outer circle edge of the 2n$^{th}$ conducting strip is connected with a conducting slip ring 2 by a conducting brush;

n rotating arms $L_i$, i=1, 3 . . . (2n−1) spaced at equal distance are fixed onto the center shaft $A_M$, n 2, 4 . . . 2n$^{th}$ bearings sleeved on $A_M$ spaced at equal distance are fixed between the rotating arms $L_i$, $L_{i+2}$ on $A_M$ and under the (2n−1)$^{th}$ rotating arm, insulated rotating arms $\tilde{L}_j$, j=2, 4 . . . 2n are fixed onto the bearings; all the distances from the ends of the rotating arms to the axis of $A_M$ are equal; the 1, 3 . . . (2n−1)$^{th}$ conducting strips are fixed at the end of the insulated rotating arm $L_i$, and the 2, 4 . . . 2n$^{th}$ conducting strips are fixed at the end of the insulated rotating arm $\tilde{L}_j$; and driven by power, the 1, 3 . . . (2n−1)$^{th}$ conducting strips rotate in the opposite direction to the 2, 4 . . . 2n$^{th}$ conducting strips, or one group of conducting strips are stationary; as these conducting strips cut magnetic lines of force during rotation and are connected in series, electromotive force $V_T$ is generated between wiring posts 1 and 2; suppose the angular velocities are respectively $\omega_1$, $\omega_2$, then $$V_T = V_{T1} + V_{T2} = (1/2)nk_3 BS_M(\omega_1 + \omega_2), \quad (2)$$

$k_3$ is the scale factor.

When the 2, 4 . . . 2n$^{th}$ conducting strips are stationary and only the 1, 3 . . . (2n−1)$^{th}$ conducting strips rotate, DC electromotive force is also generated, but the quantity is small and the structure is simple.

This form of generator does not need any magnetic conductive plate or magnetic conductive tube.

The fourth form of such generator is as follows: m magnets of the first form can be arranged on center shaft $A_M$ at equal distance in the mode of coincidence of vertical center lines of ring surfaces of the magnets in the same magnetic field direction; magnetic conductive plates $F_{M0}$, $F_{Mm}$ identical to the ring surfaces of the magnets and identical to same in state of motion are respectively added onto the outer sides of $M_1$, $M_m$, and ring plates $P_N$ are added onto the magnetic conductive plates $F_{M0}$, $F_{Mm}$;

a conducting wire twining inside a magnetic conductive plate and outside a corresponding ring plate $P_N$ and a wiring post are fixed between two adjacent magnets, between $F_{M0}$, $M_1$ and between $M_m$, $F_{Mm}$, in the mode of claim 1; or a conducting strip and a wiring post are fixed therebetween in the mode of claim 3; when the magnets are fixed, conducting strips rotating in the opposite direction and corresponding conducting slip rings are arranged in the mode of the third form;

circuits between adjacent magnets are connected in series by a conducting wire in a magnetic conductive tube; the total electromotive force is the sum of these interval electromotive force.

The fifth form of such generator is as follows: each magnet is ring-shaped, the magnetic field is in the radial direction; the ring-shaped magnet rotates around the center shaft, and the conducting wire is stationary without electric brush; the specific structure is as follows (FIG. 4): the magnet group of such generator consists of inner and outer ring-shaped magnets $M_I$ and $M_O$ each having ring shape, axial direction length of $L_M$, magnetic field in radial direction and same direction; the radius of the small ring of the inner ring magnet $M_I$ is $r_I$, the radius of the large ring thereof is $r_O = r_I + b_I$, where $b_I$ is the width of $M_I$, the radius of the small ring of the outer ring magnet $M_O$ is $R_I$, the radius of the large ring thereof is $R_O = R_I + b_O$, where $b_O$ is the width of $M_O$; $M_I$ is arranged in $M_O$, corresponding end surfaces thereof are on the same plane, perpendicular bisectors of ring surfaces coincide, the radial spacing is $S_M = R_I − r_O$, and N, S magnetic poles of the two are opposite; suppose one end surface of the $M_I$ and $M_O$ magnet group is A and the other end surface thereof is B, the end surface A is fixed onto a rotating arm, $A_M$ is driven to rotate by power, $M_I$ and $M_O$ synchronously rotate along with $A_M$;

a magnetic conductive cylinder $F_O$, which has length of $L_F = L_M$, wall thickness of $w_F$, inner radius of $r_F > r_O$, and outer radius of $R_F = r_F + w_F < R_I$, is made; a plurality of holes $H_i$, i=1, 2 . . . n are uniformly drilled in the wall of the cylinder $F_O$ in the axial direction; cylinders or cylindrical frames $C_F$ which are made of non-magnetic conductive insulation material, have the thickness of $h_O$ are respectively fixed onto the inner and outer ring surfaces of the magnetic conductive cylinder $F_O$, and $F_O$ and $C_F$ are combined into a whole $F_O$-$C_F$, a conducting wire passes through these holes and twines around $F_O$-$C_F$; one end of the conducting wire is fixed onto the wiring post 1 at end A, and the other end is fixed onto the wiring post 2 at end A;

the cylinders $F_O$ and $C_F$ around which the conducting wire is fixed is inserted between the magnets $M_I$ and $M_O$ from end A of the magnet group, so that two end surfaces of each cylinder and two end surfaces of each magnet are on the same plane respectively and $F_O$ and $C_F$ around which the conducting wire is fixed can freely rotate between $M_I$ and $M_O$, and then $F_O$ is fixed onto a corresponding bracket; $F_O$ changes the magnetic circuit, so that the conducting wire in the holes of $F_O$ will not be affected by the magnetic field; the cylinder $F_O$ may not be used, and the part of conducting wire passing through the holes of the cylinder $F_O$ is coated with high permeability magnetic material in order to change the magnetic circuit and eliminate the effect of magnetic field on this part of conducting wire;

the magnets are driven to rotate by power, the conducting wire fixed outside the cylinder $F_O$ will generate electromotive force because of cutting magnetic lines of force, and the conducting wire fixed in the holes of the cylinder $F_O$ will not cut magnetic lines of force due to the change of magnetic circuit; in this way, DC electromotive force is generated at the two ends of the conducting wire without any electric brush or semiconductor switch device, and is deduced by the law of electromagnetic induction:

$$V_T = k_5 nBL_M \bar{R}\omega \quad (3)$$

wherein $\bar{R}$ is the average radius of the conducting wire in the magnetic field and outside $F_O$, and $k_5$ is the scale factor;

the magnets are stationary, the cylinder $F_O$ with conducting wire is fixed onto the rotating arm of $A_M$, the magnets are away from $A_M$ and fixed by a bracket, and the result is identical; at this moment, the two ends of the conducting wire are connected respectively with the conducting slip rings 1 and 2; magnets $M_I$ and $M_O$ are combined into a whole or respectively made up of a plurality of small magnets, and all the small magnets have identical magnetic pole on the small rings or the large rings;

the other mode is as follows: only one ring-shaped magnet $M_I$ of which the field direction is along radial direction is used, and a non-magnetic conductive cylinder $C_F$ is fixed on only the inner ring of the magnetic conductive cylinder $F_O$; $F_O$-$C_F$ of this form and the installation mode of the conducting wire are identical to that above.

The sixth form of such generator is as follows: each magnet is ring-shaped, the magnetic field is in the radial direction, the magnet is stationary, and the conducting wire rotates;

the specific structure is as follows (FIG. 5): a ring-shaped chute $O_I$ with a downward opening is fixed onto the inner ring surface of the magnet $M_I$ of the fifth form, where the outer radius of $O_I$ is: $r_{OO}=r_I$, the inside radius is: $r_\alpha=r_Ib_\alpha$, $b_\alpha$ is the width of $O_I$, and the radius of circle corresponding to the midpoint of the cross section of $O_I$ is:

$$r_{OM}=r_I-b_\alpha/2;$$

a ring-shaped conducting wire bracket $F_C$ is made, the inner ring plate of $F_C$ is a magnetic conductive plate $F_M$, and $F_M$ is provided therein with a plurality of holes which are parallel to the axial direction thereof and through which conducting wires can pass; the outer radius of $F_M$ is: $r=r_{FMO}=r_\alpha-\varepsilon_{FMO}$, $\varepsilon_{FMO}$ is the clearance between $F_M$ and the chute $O_I$, the inner radius is: $r_{FM}=r_\alpha-w_{FM}$, and $w_{FM}$ is the thickness of $F_M$; the inner radius and outer radius of the outer ring of $F_C$ are $r_{F\alpha}=r_O+\varepsilon_{FM}$ and $r_{F\infty}=r_{F\alpha}+w_{F\alpha}<R_I$ respectively, $w_{FO}$ is the thickness of the outer ring of $F_C$, the length of $F_C$ is: $L_F=L_M+2w_F+2\varepsilon_{FM}$, $w_F$ is the thickness of the top frame and the bottom frame of $F_C$, and $\varepsilon_{FM}$ is the clearance between $F_C$ and the magnet $M_I$; the ring-shaped bottom frame of $F_C$ is fixed, and the ring-shaped top frame of $F_C$ is detachable;

three, four or six identical rotating arms perpendicular to the center shaft are symmetrically fixed on the center shaft $A_M$, these rotating arms support a chute $\tilde{O}_I$ having a midpoint of the cross section on the circle with the radius $r_{AM}=r_{OM}$, having inner radius and outer radius of $r_{AM}=r_{FMD}$, $r_{AMD}=r_I-\varepsilon_{FMD}$ respectively, having an upward opening and matching the chute $O_I$, $\tilde{O}_I$ is in $F_C$ and is fixed onto the outer ring surface of the magnetic conductive plate $F_M$, balls are arranged between the chutes $O_I$ and $\tilde{O}_I$, and $O_I$ is buckled on $\tilde{O}_I$; in this way, $O_I$ and the magnet $M_I$ carried thereby can freely rotate on $\tilde{O}_I$ around $A_M$; the center shaft $A_M$ of the magnet is also a center shaft of $F_C$;

when $A_M$ is driven to rotate by external force, $F_C$ simultaneously rotates along with same, but the magnet $M_I$ is stationary, this is because that the magnet $M_O$ fixed on the bracket attracts $M_I$ and the chute $O_I$ on $M_I$ can slide freely on $\tilde{O}_I$;

the balls are placed in the chute $\tilde{O}_I$, the magnet $M_I$ is inserted in $F_C$, the chute $O_I$ fixed onto $M_I$ is made to fall on these balls, and the top frame is fixed onto $F_C$;

in the mode of the fifth form, the conducting wire is made to pass through the top frame to the magnetic conductive plate $F_M$ of the inner ring of $F_C$ from the point A on the outer side of the top of $F_C$, pass through the small holes of $F_M$ to the bottom of $F_C$, pass through the bottom frame to the outer ring surface of $F_C$, pass through the outer ring surface of $F_C$, and return to the adjacent point A on the outer side of the top of $F_C$; the process is repeated for many times according to needs, the conducting wire is fully arranged on the outer ring surface of $F_C$, and then all parts of the conducting wire are respectively fixed onto various parts in $F_C$; the two ends of the conducting wire are respectively connected to the two slip rings 1, 2 by an electric brush;

the center shaft $A_M$ is driven to rotate by power, $F_C$ simultaneously rotates along with same, the magnet $M_I$ is stationary, the conducting wire which twines around the outer ring of $F_C$ will rotate in the single direction of cutting the magnetic line of force along with same, the conducting wire passing through the small holes formed in the high permeability material from the inner ring does not cut the magnetic line of force, and the contributions of the conducting wire on the top frame and the bottom frame to electromotive force are mutually offset; in this way, after an external circuit is connected, as long as the rotational speed of $A_M$ is constant, steady and constant DC electromotive force will be generated at the two ends of the conducting wire, as described by formula (3), wherein the factor $k_5$ is changed into $k_6$.

The seventh form of such generator is as follows: each of the magnets $M_I$, $M_O$ is ring-shaped, the magnetic field is in the radial direction, the conducting wire is stationary, and the magnet rotates around the center shaft $A_M$ thereof;

the specific structure (FIG. 6-1) is as follows: each of the magnet group, the ring-shaped conducting wire bracket and the position thereof in the magnet group, the magnetic conductive plate in the conducting wire bracket, the center shaft and the bottom plate is identical to that of the sixth form; the difference is in that: the conducting wire bracket $F_C$ is not connected with the center shaft $A_M$ and is stationary, and the magnet rotates along with $A_M$;

three, four or six identical support posts Z parallel to $A_M$ are uniformly and symmetrically fixed onto the circle taking the axis of as a center of a circle and taking $r_\alpha=r_I+b_I/2$ as a radius on the bracket $P_C$ fixed onto the bottom plane P of the generator, a chute $\tilde{O}_I$ having a section in small semicircle shape, having an upward opening and filled with appropriate balls is fixed onto the top of each of these support posts; three, four or six identical rotating shafts $H_{AI}$ parallel to $A_M$ are uniformly and symmetrically fixed onto the circle taking $r_{AI}=r_I-r_W$ as a radius on $P_C$, where $r_W$ is a distance from the center of each of the rotating shafts $H_{AI}$, to the inner ring surface of the magnet $M_I$; $H_{AI}$ is installed on the bracket $P_C$ through a bearing, and $H_{AI}$ can freely rotate relative to $P_C$; the lengths of the rotating shafts $H_{AI}$, under and above $P_C$ are $L_{H1}$ and $L_{H2}<L_M$ respectively, and a clearance with a height of $h_{HP}$, is arranged between the bottom surface of $H_{AI}$, and the bottom plane P of the generator; a rotating arm is fixed at the position corresponding to the clearance of $h_{HP}$, between $H_{AI}$ and P on the lower part of the center shaft $A_M$, and a ring $C_{AH}$ having inner radius of $r_I$ is fixed onto the rotating arm; two identical drive wheels $W_{AH1}$ and $W_{AH2}$ having radius of $r_W$ are respectively fixed onto the part of $H_{AI}$, under and above the bracket $P_C$, $W_{AH1}$ is tangential to and in close contact with the inner ring surface of $C_{AH}$, $WV_{AH2}$ is tangential to and in close contact with the inner ring surface of the magnet $M_I$ to be installed, and $C_{AH}$ can drive $W_{AH1}$ and $W_{AH2}$ to rotate at the same linear velocity, thereby driving $M_I$ to rotate;

a chute $O_I$ with a downward opening matching the chute $\tilde{O}_I$ on the support post Z is fixed onto the circle taking $r_\alpha=r_I+b_I/2$ as a radius on the bottom surface of $M_I$, $M_I$ is installed on the post Z, $M_I$ and the chute $O_I$ is buckled on the chute $\tilde{O}_I$; in this way, $M_I$ is supported by Z, $M_I$ is enabled to freely rotate on $\tilde{O}_I$ around $A_M$, and $W_{AH2}$ is enabled to be tangential to and in close contact with the inner ring surface of $M_I$;

a ring-shaped conducting wire bracket $\tilde{F}_C$ is made around the ring-shaped magnet $M_I$, $\tilde{F}_C$ is fixed onto the post Z, the outer ring surface radius of the inner ring and inner ring surface radius of the outer ring of $\tilde{F}_C$ are $r_{FI}=r_I-\varepsilon_{FI}$, $r_{FO}=r_O+\varepsilon_{FI}$ respectively, $\varepsilon_{FI}\ll r_I$, and is the clearance between $\tilde{F}_C$ and the corresponding surface of the magnet; clearance between the upper ring frame $\tilde{E}_{F2}$ of $\tilde{F}_C$ and the top surface of $M_I$ is also $\varepsilon_{FI}$, the clearance between the lower ring frame $\tilde{E}_{F1}$ of $\tilde{F}_C$ and the bottom surface of $M_I$ is $h_O$, $h_O$ is the total height of the chutes $O_M$ and $\tilde{O}_M$ which are buckled together; the inner ring of $\tilde{F}_C$ is a ring-shaped magnetic conductive plate, and holes parallel to $A_M$ and through which the conducting wire passes are formed therein; the tangential part of the drive wheels $W_{AH2}$, $W_{AI2}$ and the magnet $M_I$ is the gap of the ring-shaped magnetic conductive plate, and no conducting wire passes through this part, thus $W_{AH2}W_{AI2}$ can be in close contact with the inner ring surface of $M_I$;

the conducting wire is twined around the conducting wire bracket $F_C$ in the mode of the sixth form without electric brush, and the two ends of the conducting wire are connected to the wiring posts; the magnet $M_O$ is fixed by the rotating arm on the upper part of $A_M$;

if $A_M$ is driven to rotate by power, $A_M$ drives the ring $C_{AH}$, $W_{AI1}$, $W_{AI2}$ and $M_I$ to rotate, because $W_{AI1}$ is identical to $W_{AI1}$ in radius, $C_{AH}$ is identical to $M_I$ in inner diameter and $M_O$ is fixed onto the rotating arm of $A_M$, the angular velocities of $M_I$ and $M_O$ are identical to that of $A_M$ respectively and the conducting wire is stationary; in this way, the conducting wire performs relative motion of cutting the magnetic line of force; because a magnetic circuit is changed by the magnetic conductive plate having holes of the inner ring of $\tilde{F}_C$, and no or few magnetic lines of force in the inner ring of $\tilde{F}_C$ are cut by the conducting wire, DC electromotive force described by formula (3) is generated at the two ends of the conducting wire, wherein the factor is changed into $k_7$;

the other mode to achieve the function of the chutes $O_M$ and $\tilde{O}_M$ is as follows: a radial rotating shaft, a roller on the rotating shaft and a slide rail corresponding to the roller are fixed onto $O_M$ and $\tilde{O}_M$ at corresponding positions, and the total height of the slide rail and the roller is identical to the total height of $O_M$ and $\tilde{O}_M$;

the other mode to achieve the function of the drive wheels is as follows: synchronous rotation of $M_O$ and $M_I$ is achieved by a gear or pulley;

the other mode of the conducting wire bracket $\tilde{F}_C$ is as follows (FIG. 6.2): $M_I$ is fixed onto the rotating arm of $A_M$, the conducting wire bracket $\tilde{F}_C$ surrounds the magnet $M_O$, the support posts Z and rotating shafts $H_{AO}$ of the drive wheels of corresponding chutes $\tilde{O}_O$ are directly fixed onto the bottom plate P without $P_C$, there is no ring $C_{AH}$, and the ring $\tilde{C}_{AMO}$ having outer radius of $R_O$ is fixed onto $A_M$; and the drive wheels on $H_{AO}$ are $W_{AO1}$, $W_{AO2}$ which are tangential to and in close contact with $M_O$ and the ring $\tilde{C}_{AMO}$.

The eighth form of such generator is as follows: the ring-shaped magnets $M_I$, $M_O$ with the magnetic field in radial direction are stationary, and the ring-shaped conducting strips rotate around $A_M$ in the opposite direction with an electric brush; the specific structure (FIG. 7) is as follows: the center shaft $A_M$ does not rotate, and the magnets $M_I$, $M_O$ are respectively fixed onto the center shaft $A_M$ and the bottom plate P; n=2n ring-shaped conducting strips having the thickness of $h_C$, height of $L_M$, and radii of $R_{C1}=r_O+s_m$, $R_{C2}=r_C+h_C+2s_m$, ... $R_{On}=r_O+(n-1)h_C+ns_m$ respectively are arranged between $M_I$, $M_O$, where $s_m$ represents spacing between the adjacent ring-shaped conducting strips and ring-shaped conducting strips 1, n and adjacent magnets $M_I$ and $M_O$ respectively, $R_I-r_O=nh_C+(n+1)s_m$, $r_O$ and $R_I$ respectively represent the radius of the outer ring surface of the magnet $M_I$ and the radius of the inner ring surface of the magnet $M_O$; the center lines of the ring surfaces of the n ring-shaped conducting strips coincide, the conducting strips are arranged from inside to the outside in accordance with the order of radii, two end surfaces of the n conducting rings are respectively arranged on the planes of the two end surfaces of the ring-shaped magnets;

suppose the upper part and the lower part of the $j^{th}$ conducting ring are $A_j$, $B_j$ respectively, make (n+1) conducting pulleys or conducting brushes $Q_k$, k=1, 2 ... (n+1), the upper part $A_I$ of the $1^{st}$ conducting ring is connected to the conducting slip ring 1 by $Q_1$, $B_1$, $B_2$ are communicated by $Q_2$, $A_2$, $A_3$ are communicated by $Q_3$, $B_3$, $B_4$ are communicated by $Q_4$, and so on, $B_{(n-1)}$, $B_n$ are communicated by $Q_n$, and the upper edge $A_n$ of the $n^{th}$ conducting ring is connected to the conducting slip ring 2 by $Q_{(n+1)}$; the group of conducting rings arranged in this way are installed in place between the magnets $M_I$, $M_O$, the center lines thereof coincide with the center lines of $M_I$, $M_O$, and the corresponding end surfaces are on the same plane;

upper and lower sleeves $\tilde{A}_{M1}$, $\tilde{A}_{M2}$ are provided on the center shaft $A_M$, and $\tilde{A}_{M1}$, $\tilde{A}_{M2}$ are driven to rotate around $A_M$ by power in the opposite direction; the upper parts of the $1^{st}$, the $3^{rd}$ ... the $(2\tilde{n}-1)^{th}$ conducting rings are fixed onto the rotating arms of $\tilde{A}_{M1}$ located above the conducting rings, and the $2^{nd}$, the $4^{th}$ ... the $2\tilde{n}^{th}$ conducting rings are fixed onto the rotating arms of $\tilde{A}_{M2}$ located below the conducting rings; and the magnets are stationary, $M_I$ is fixed onto the stationary shaft $A_M$, and $M_O$ is fixed onto the bracket of the bottom plate P; if $\tilde{A}_{M1}$, $\tilde{A}_{M2}$ are driven to rotate by power in the opposite direction and the angular velocities are respectively $\omega_1$, $\omega_2$, DC electromotive force is generated at the two ends of the conducting wire; electromotive force $V_T$ is the sum of the electromotive force of each conducting ring, $$V_T = V_{T1} + V_{T2} = k_8 2nBL_M \overline{R} (\omega_1 + \omega_2) \qquad (4)$$

wherein $\overline{R}$ is the average of n radii $R_{cj}$; and the ring-shaped conducting strips can also be replaced by conducting wires connected in parallel at the two ends.

Such generator does not need any magnetic conductive plate or magnetic conductive tube either.

The ninth form of such generator is as follows (FIG. 8): the magnet is stationary, but the conducting wire rotates; 4 ring-shaped magnets $M_A$, $M_B$, $M_C$, $M_D$ with the magnetic field in radial direction have the same length and ring width which are $L_M$, $b_M$ respectively, and the inner radius and outer radius of $r_{AI}$, $r_{AO}$, $r_{BI}$, $r_{BO}$, $R_\alpha$, $R_{CO}$, $R_{DI}$, $R_{DO}$, $r_{BI}-r_{AO}=R_{CI}-R_{CO}\equiv a$, and $R_{CI}-r_{BO}\equiv b$; wherein the magnetic field directions of magnets $M_A$, $M_B$ are identical, the magnetic field directions of $M_C$, $M_D$ are identical as well, but the magnetic field directions of $M_A$, $M_B$ are opposite to that of $M_C$, $M_D$; the four magnets are arranged in the order of $M_A$, $M_B$, $M_C$, $M_D$, from inside to the outside, wherein the axial center lines of the four magnets coincide, and end surfaces are on the same plane;

the ring-shaped magnetic conductive plate $F_{MB}$ having inner radius of $r_{MBi}=r_{BO}$, outer radius of $r_{MBO}=r_{BO}+w_{MBC}$ and height of $L_{MBC}=L_M$ is fixed onto the large ring surface of $M_B$, where $w_{MBC}$ represents the width of $F_{MB}$, and the ring-shaped magnetic conductive plate $F_{MC}$ having outer radius of $R_{MCO}=R_\alpha$, inner radius of $R_{M\alpha}=R_\alpha-w_{MBC}$ and height of $L_{MBC}=L_M$ is fixed onto the small ring surface of $M_C$;

two ring-shaped magnetic conductive plates $E_1$ and $E_2$ having height of $h_{FE}$ and inner and outer radii of $r_{BO}$, $R_\alpha$ respectively are made, and n holes through which insulated conducting wires can pass are drilled in the upper part of $E_1$ and the lower part of $E_2$ in the radial direction;

the ring-shaped conducting wire bracket $F_{BC}$ used for fixing conducting wire is made around the inner side surface of the magnet $M_B$, the outer side surface of $M_C$, the upper surface and lower surface of $M_B$ and $M_C$, wherein $F_{BC}$ consists of an inner ring surface, an outer ring surface, a bottom frame $\tilde{E}_1$ and a top frame $\tilde{E}_2$; the inner ring surface radius and outer ring surface radius of $F_{BC}$ are $r_{FBC}=r_{BI}-\varepsilon_{FBC}$ and $R_{FBC}=R_\infty+\varepsilon_{FBC}$ respectively; $E_2$ and $E_1$ are respectively used as the middle parts of the top frame $\tilde{E}_2$ and the bottom frame $\tilde{E}_1$ and fixed together with the rest part of $\tilde{E}_2$ and $\tilde{E}_1$, and the bottom surface of $\tilde{E}_2$ and the bottom surface of $E_2$ are on the same plane; the top surface of $\tilde{E}_1$ and the top surface of $E_1$ are on the same plane; $\varepsilon_{FBC}$ represents the clearance between the inner ring surface of $M_B$, the outer ring surface of $M_C$, and the upper surface and lower surface of $M_B$ and $M_C$ and conducting wires installed on corresponding parts of $F_{BC}$;

a ring device $G_{PF}$ is installed on the bottom plate P, $G_{PF}$ is on the circle taking the axis of $A_M$ as a center and taking $R_{BC} = (R_\alpha + r_{BO})/2$ as a radius, and $F_{BC}$ can rotate freely on $G_{PF}$ around shaft $A_M$; a device $G_{FBC}$ which enables $\tilde{E}_1$ and $M_B$, $M_C$ to rotate relatively around shaft $A_M$ is installed in $F_{BC}$ between $\tilde{E}_1$ and the bottom surface of $M_B$, $M_C$ which are fixed together; the perpendicular bisectors of $M_B$, $M_C$ coincide with the axis shaft $A_M$; the magnetic conductive plate $E_2$ on the upper part of $F_{BC}$ is fixed on the rotating arm of $A_M$, and radius of the rotating arm is $R_{BC}$; when $F_{BC}$ rotates around $A_M$, the magnets $M_B$, $M_C$ can keep stationary;

one embodiment of $G_{PF}$ and $G_{FBC}$ is as follows: rings $C_{BC1}$, $C_{BC2}$ having inner diameter of $r_{MBO}$, outer diameter of $R_{M\alpha}$ and thickness of $h_O$ are respectively fixed between $F_{MC}$ and $F_{MB}$ at a position $h_{BC}$ away from the bottom surface of $M_B$ and $M_C$ and a position $h_{BC}$ away from the top surface thereof, the circle with radius of $R_{BC}$ which is below $C_{BC1}$ and above $C_{BC2}$ is respectively provided thereon with respectively chutes $O_{BC1}$, $O_{BC2}$ of which the cross sections are in identical small semicircle shape, $O_{BC1}$ having a downward opening, and $O_{BC2}$ having an upward opening; the magnets $M_B$ and $M_C$ are fixed together by $C_{BC1}$, $C_{BC2}$;

the circle with radius of $R_{BC}$ which is above $E_1$ and below $E_2$ is respectively provided thereon with chutes $\tilde{O}_{BC1}$, $\tilde{O}_{BC2}$ matching chutes $O_{BC1}$, $O_{BC2}$; $\tilde{O}_{BC1}$ having an upward opening, and $\tilde{O}_{BC2}$ having a downward opening; balls can be accommodated between $O_{BC1}$ and $\tilde{O}_{BC1}$ and between $O_{BC2}$ and $\tilde{O}_{BC2}$; the total height of $\tilde{O}_{BC1}$ filled with balls and $O_{BC1}$ is $h_{BC} + \varepsilon_{FBC}$, and the total height of $O_{BC2}$ filled with balls and $\tilde{O}_{BC2}$ is also $h_{BC} + \varepsilon_{FBC}$; $E_2$ is fixed onto the rotating arm of $A_M$, the perpendicular bisector of $E_2$ coincides with that of the ring surface of the magnet, the chute $\tilde{O}_{BC2}$ below $E_2$ is buckled on the chute $O_{BC2}$ filled with balls;

the circle with radius of $R_{BC}$ below $E_1$ is provided thereon with a chute $\tilde{O}_{XBC1}$ which has a downward opening and is identical to $\tilde{O}_{BC1}$ in the rest part; the bottom plate P is provided thereon with a chute $O_{XBC1}$ with an upward opening matching $\tilde{O}_{XBC1}$, and the perpendicular bisector of $O_{VBC1}$ coincides with that of the ring surface of the magnet;

after the chute $O_{XBC1}$ is filled with balls, the bracket $F_{BC}$ not installed with a top plate $\tilde{E}_2$ is installed on the chute $O_{XBC1}$, the chute $\tilde{O}_{XBC1}$ below $\tilde{E}_1$ is buckled on the chute $O_{XBC1}$, and $G_{PF}$ is composed of the chutes $O_{XBC1}$ and $\tilde{O}_{XBC1}$ and the balls therebetween; the magnets $M_B$, $M_C$ fixed together are installed in $F_{BC}$, $O_{BC1}$, is buckled on $\tilde{O}_{BC1}$ filled with balls, and $G_{FBC}$ is composed of $O_{BC1}$ and $\tilde{O}_{BC1}$ and the balls therebetween;

$F_{BC}$ top plate $\tilde{E}_2$ onto which $E_2$ is fixed is installed on the magnets $M_B$, $M_C$, and $\tilde{O}_{BC2}$ is buckled on $O_{BC2}$ filled with balls; and then the top plate $\tilde{E}_1$ is fixed together with the rest part of the bracket $F_{BC}$;

at point A on the outer circle of the top of the bracket $F_{BC}$, one end of the conducting wire is connected to the conducting slip ring 1, and the other end is made to run along the radial direction, pass through the small holes in $E_2$, reach the inner ring surface of $F_{BC}$ along the radial direction, reach the bottom of $F_{BC}$ along the inner ring surface of $F_{BC}$, reach the small holes in $E_1$ along the radial direction, pass through the small holes in $E_1$ to the outer ring of $F_{BC}$, and return to the adjacent point A on the outer circle of the top of $F_{BC}$ along the outer ring surface of $F_{BC}$; this process is repeated until the conducting wire comes out from the $n^{th}$ hole and returns to the outer circle of the top of $F_{BC}$; or a plurality of conducting wires are twined on $F_{BC}$ according to needs; this end of the conducting wire is connected to the slip ring 2 by an electric brush; $F_{BC}$ can rotate freely relative to the magnets $M_B$, $M_C$ which are fixed together;

the assembly process is as follows: the magnet $M_A$ is fixed onto the bottom plane P of the generator; after being provided thereon with ring-shaped magnetic conductive plates $F_{MB}$, $F_{MC}$ respectively and connected together by ring plates $C_{BC1}$, $C_{BC2}$, $M_B$, $M_C$ are installed in the conducting wire bracket $F_{BC}$ provided thereon with the bottom frame $\tilde{E}_1$; then the top frame $\tilde{E}_2$ of $F_{BC}$ is fixed, the conducting wire is made to pass through the holes of $E_1$, $E_2$ and twine on the conducting wire bracket $F_{BC}$, such $F_{BC}$ is installed outside $M_A$, at the same time, the chute $\tilde{O}_{XBC1}$ below $E_1$ is buckled on the chute $O_{XBC1}$ which is on the bottom plate P and filled with balls, the magnet $M_D$ is fixed onto the bottom plane P outside the conducting wire bracket $F_{BC}$, and the corresponding end surfaces of $M_A$, $M_D$, $M_B$, $M_C$ are on the same plane; and finally, $E_2$ on $F_{BC}$ is fixed onto the rotating arm of $A_M$;

when the bracket $F_{BC}$ rotate along with the center shaft, the magnets $M_B$, $M_C$ cannot rotate along with the center shaft due to the fact that the magnets $M_A$, $M_D$ attract $M_B$, $M_C$ and $F_{BC}$ can rotate freely relative to the magnets $M_B$, $M_C$; when the center shaft is driven to rotate by power, the conducting wire will move to cut magnetic line of force, DC electromotive force $V_T = V_{AB} + V_{CD}$ is generated because the field directions between $M_A$, $M_B$ and between $M_C$, $M_D$ are opposite, $V_{AB}$, $V_{CD}$ respectively represent the electromotive force generated by the conducting wire between $M_A$, $M_B$ and between $M_C$, $M_D$, and $V_{AB}$, $V_{CD}$ are described by formula (3), wherein the scale factor is changed into $k_9$;

the other embodiment of $G_{PF}$ and $G_{FBC}$ is as follows: a radial rotating shaft and a roller on the rotating shaft are installed below $E_1$ at a position corresponding to $\tilde{O}_{XBC1}$, a slide rail corresponding to the roller is fixed onto the bracket $P_C$ at the position of $O_{XBC1}$, and the total height of the slide rail and the roller is identical to the total height of $O_{XBC1}$ and $\tilde{O}_{XBC1}$; a radial rotating shaft and a roller on the rotating shaft are installed at a corresponding position of $O_{BC1}$, a slide rail corresponding to the roller is fixed at the position of $\tilde{O}_{BC1}$, and the total height of the slide rail and the roller is identical to the total height of $O_{BC1}$ and $\tilde{O}_{BC1}$.

The mode of making the conducting wire bracket $F_{BC}$ rotate and the magnets $M_B$, $M_C$ stationary is just a simple and possible mode, but not the best mode. A plurality of slightly more complex modes can be used to better achieve this purpose.

The tenth form of such generator is as follows: the conducting wire is stationary, but the magnet arranged in the opposite direction rotates; the specific structure is as follows (FIG. 9): the magnets $M_A$, $M_B$, $M_C$, $M_D$, and the installation mode thereof, the ring-shaped magnetic conductive plates $F_{MB}$, $F_{MC}$ fixed onto $M_B$, $M_C$, and the conducting wire bracket are identical to that of the ninth form respectively; the difference is in that: the conducting wire bracket $F_{BC}$ is not fixed onto the rotating arm of $A_M$, but the magnets $M_A$, $M_D$ are fixed onto the rotating arm, $M_A$, $M_B$ directly rotate along with the center shaft, and the magnets $M_B$, $M_C$ synchronously rotate together with $M_A$, $M_D$ through a drive device with identical angular velocity;

three, four or six identical support posts $Z_{BC}$ parallel to $A_M$ are uniformly and symmetrically fixed onto the circle taking the axis of $A_M$ as a center of a circle and taking $\tilde{R}_{BC}$ as a radius on the bottom plane P, $R_\alpha > \tilde{R}_{BC} \geq (r_{BO} + R_\alpha)/2$, these support posts $Z_{BC}$ pass through the bottom frame $\tilde{F}_{BC}$ of $Z_{BC}$, and $\tilde{E}_1$ and the bracket $\tilde{F}_{BC}$ are fixed onto these support posts $Z_{BC}$; the distance from the top surface of these support posts to the bottom frame $\tilde{E}_1$ of $\tilde{F}_{BC}$ is $h_Z$, and a ring plate $C_Z$ with radius of $\tilde{R}_{BC}$ is fixed at the top of the support posts; a device $\tilde{G}_{FBC}$ which enables $M_B$, $M_C$ to rotate around shaft $A_M$ is installed between $C_Z$ and a ring plate $\tilde{C}_{BC1}$ which fix $M_B$, $M_C$ together;

three, four or six identical rotating shafts $H_{AB}$ parallel to $A_M$ are uniformly and symmetrically fixed onto the circle fixed onto the bottom plane P and taking $r_{AH}=(r_{BO}+w_{MBC})+r_{HBF}$ as a radius, where $r_{HBF}$ is a distance from the center of each of the support posts $H_{AB}$ to the outer ring surface of the magnetic conductive plate $F_{MB}$ of the magnet $M_B$, $r_{HBF} < [\tilde{R}_{BC}-(r_{BO}+w_{MBC})]/2$, as described above, $w_{MBC}$ is the width of $F_{MB}$; $H_{AB}$ passes through the bottom frame $\tilde{E}_1$ of $F_{BC}$ and is installed on the P through a bearing, and $H_{AB}$ can freely rotate relative to P; the distance between the top surface of $H_{AB}$ and the upper surface of the bottom frame $\tilde{E}_1$ of $\tilde{F}_{BC}$ is $h_{AB2}$, $h_{AB2} < h_Z$; two identical drive wheels $W_{AB2}$ and $W_{AB1}$ with the radius of $r_{HBF}$ are respectively fixed in the positions $h_{AB2}$ away from the upper surface and $h_{AB1}$ away from the lower surface of the bottom frame $\tilde{E}_1$ of $\tilde{F}_{BC}$ on $H_{AB}$;

a rotating arm is fixed in a position corresponding to the drive wheel $W_{AB1}$ on the center shaft $A_M$, and a ring $C_{AB}$ with radius of outer circle of $r_{MBO}=(r_{BO}+w_{MBC})$ is fixed on the rotating arm; $W_{AB1}$ is tangential to and in close contact with the outer ring surface of $C_{AB}$, $W_{AB2}$ will be tangential to and in close contact with the outer ring surface of the magnetic conductive plate $F_{MB}$ of $M_B$, and $C_{AB}$ can drive $W_{AB1}$ and $W_{AB2}$ to rotate at the same linear velocity, thereby driving $M_B$ and $M_C$ fixed together to rotate;

the circle with radius of $\tilde{R}_{BC}$ which is above the ring plate of the support posts $Z_{BC}$ and below the top frame $\tilde{E}_2$ is respectively provided thereon with chutes $\tilde{O}_{BC1}$ and $\tilde{O}_{BC2}$; rings $\tilde{C}_{BC1}$, $C_{BC2}$ having inner diameter of $r_{MBO}$, outer diameter of $R_{MOl}$ and thickness of $h_O$ are respectively fixed between the magnets $M_B$ and $M_C$ at a position $h_{BC}$ ($h_{BC} > h_Z$) away from the bottom surface thereof and a position $h_O$ away from the top surface thereof, the circle with radius of $\tilde{R}_{BC}$ which is below $\tilde{C}_{BC1}$ and above $C_{BC2}$ is respectively provided thereon with chutes $O_{BC1}$, $O_{BC2}$ of which the cross sections are in identical small semicircle shape matching the chutes $\tilde{O}_{BC1}$ and $\tilde{O}_{BC2}$, $O_{BC1}$ having a downward opening, and $O_{BC2}$ having an upward opening; one embodiment of device $\tilde{G}_{FBC}$ is composed of $O_{BC1}$ and $\tilde{O}_{BC1}$ and the balls therebetween; the magnets $M_B$ and $M_C$ are fixed together by $\tilde{C}_{BC1}$, $C_{BC2}$;

the support posts $Z_{BC}$, the rotating shaft $H_{AB}$ and the drive wheel $W_{AB1}$ are fixed on the bottom plane P; $H_{AB}$ passes through the bottom frame $\tilde{E}_1$ of the bracket $\tilde{F}_{BC}$, and the drive wheel $H_{AB}$ is installed on $W_{AB2}$; $E_1$ on $\tilde{F}_{BC}$ are fixed onto $Z_{BC}$; the ring plate is fixed on the top of these support posts $Z_{BC}$, the drive device $\tilde{G}_{FBC}$ is installed between the ring plate and the bottom surfaces of $M_B$, $M_C$, i.e., the chute $O_{BC1}$ is buckled on the chute $\tilde{O}_{BC1}$ filled with balls; then the top plate $\tilde{E}_2$ of $\tilde{F}_{BC}$ is installed, $\tilde{O}_{BC2}$ is buckled on $O_{BC2}$ filled with balls, and $\tilde{E}_2$ is fixed;

the conducting wire passes through the holes in $E_1$, $E_2$ and twines on $\tilde{F}_{BC}$ in the mode of the ninth form, and the two ends of the conducting wire are fixed onto the wiring posts; the magnets $M_A$, $M_D$ are fixed onto the rotating arm of $A_M$, the perpendicular bisectors of $M_A$, $M_D$ coincides with the axis of $A_M$, and the two end surfaces thereof are respectively on the same plane with the corresponding end surfaces of $M_B$, $M_C$; the rotating arm and the rings $C_{AB}$ are fixed on $A_M$, $W_{AB1}$ is tangential to and in close contact with $C_{AB}$, and $W_{AB2}$ is tangential to and in close contact with the outer ring surface of the magnetic conductive plate $F_{MB}$ of the magnet $M_B$; $Z_{BC}$ is used to fix $F_{BC}$ and support $M_B$, $M_C$, and $M_B$, $M_C$ can freely rotate around $A_M$;

$A_M$ is driven by power to rotate in the direction opposite to that of claim 9; as the radius of $C_{AB}$ fixed on the rotating arm of $A_M$ is identical to the radius of $F_{MB}$, and the radii of the drive wheels $W_{AB1}$ and $W_{AB2}$ are identical, the magnets $M_A$, $M_B$, $M_C$, $M_D$ will synchronously rotate together with $A_M$ at identical angular velocity, the conducting wire is stationary, and electromotive force is generated in the same mode as that of the ninth form;

the other embodiment of $G_{FBC}$ is as follows: a radial rotating shaft and a roller on the rotating shaft are installed at a corresponding position of $O_{BC1}$, a slide rail corresponding to the roller is fixed at the position of $O_{BC1}$, and the total height of the slide rail and the roller is identical to the total height of $O_{BC1}$ and $O_{BC1}$.

the other mode to achieve the function of the drive wheels is as follows: synchronous rotation of $M_B$, $M_C$ and $M_A$, $M_D$ is achieved by a gear or pulley;

the eleventh form of such DC generator without reversing is as follows: the conducting wire in the conductor loop is stationary, but the magnet rotates, wherein the magnet group consists of four ring-shaped magnets $M_A$, $M_B$, $M_C$, $M_D$ identical to that in the first form and perpendicular to the ring surface in magnetic field direction, the perpendicular bisectors thereof respectively coincide with the center line of $A_M$, the magnets are arranged from top to bottom in the order of $M_A$, $M_B$, $M_C$, $M_D$, N, S magnetic poles of $M_A$ and $M_B$ are opposite, the distance therebetween is $d_{AB}$, S, N magnetic poles of $M_C$ and $M_D$ are opposite, the distance therebetween is $d_{CD}=d_{AB}$, S pole of $M_C$ and S pole $M_B$ are opposite, the distance between $M_B$, $M_C$ is $d_{BC}$, and ring-shaped magnetic conductive plates are arranged between $M_B$, $M_C$; The specific structure is as follows:

the ring-shaped magnetic conductive plates $F_{PB}$ and $F_{PC}$ are respectively fixed below the magnet $M_B$ and above the $M_C$, $F_{PB}$ is identical to $F_{PC}$, the thickness is $h_{MBC}$, and the radius of the inner circle and the radius of the outer circle are $r_{MBC}=r_M$, $R_{MBC}=R_M$ respectively; the distance between the opposite surfaces of $F_{PB}$ and $F_{PC}$ is $d_{MBC}=d_{BC}-2h_{MBC}$, and the ring-shaped magnetic conductive plate $F_{PBC}$ with the thickness of $d_{MBC}$, and inner circle radius and outer circle radius of $r_{MBC}=r_M+a_{MBC}$, $\tilde{R}_{MBC}=R_M-b_{MBC}$ respectively is added between $F_{PB}$ and $F_{PC}$; $M_B$, $F_{PB}$ and $F_{PBC}$ are fixed together, $M_C$ and $F_{PC}$ are fixed together, and $M_B$, $F_{PB}$ and $F_{PBC}$ as a whole are tightly combined with and $M_C$ and $F_{PC}$ as a whole, but may be demounted; after installation, $M_B$ and $F_{PBV}$, and $F_{BC}$ and $M_C$ respectively coincide with the perpendicular bisector of the ring surface of $F_{PC}$; the circles with radii of $r_{FBI}=r_M+a_{MBC}/2$ and $R_{FBO}=R_M-b_{MBC}/2$ below the ring-shaped magnetic conductive plate $F_{PB}$ are respectively provided thereon with chutes $\tilde{O}_{FBl}$, $\tilde{O}_{FBO}$ of which the cross sections are in small semicircle shape;

the center shaft $A_M$ is also made of high permeability material; a bearing is fixed in the position of $h_{AF}$ in height of the center shaft $A_M$, the ring-shaped magnetic conductive plate $F_{ABl}$ taking the radius of the bearing as inner radius and having outer radius of $\tilde{r}_{MBC}=r_M+a_{MBC}-\varepsilon_{FBC}$ is fixed onto the bearing, where at the part of $r \leq r_M-\varepsilon_{FBC}$, the thickness of $F_{ABl}$ is $d_{BC}$, and at the part of $r_M-\varepsilon_{FBC}$, the thickness of $F_{ABl}$ is $d_{BC}=d_{BC}-2h_{MBC}-h_{OFB}-\varepsilon_{FBC}$; a chute $O_{FBl}$ matching the chute $\tilde{O}_{FBl}$ is arranged on the circle with radius of $r_{FBl}=r_M+a_{MBC}/2$ above $F_{ABl}$, wherein the total thickness is $h_{OFB}$ after $O_{FBl}$ and $\tilde{O}_{FBl}$ are combined together, and $\varepsilon_{FBC} \ll r_M$ represents clearance; a ring-shaped magnetic conductive plate $F_{ABO}$ with inner ring radius and outer ring radius of $R_{FBI}=R_M-b_{MBC}+\varepsilon_{FBC}$ and $R_{FBO}=R_M+c_{FBC}$ respectively is made, at the part of $R\geq R_M+\varepsilon_{FBC}$, the thickness of $F_{ABO}$ is $d_{BC}$, and at the part of $R_M+\varepsilon_{FBC}\geq R\geq R_M-b_{MBC}+\varepsilon_{FEC}$, the thickness of $F_{ABO}$ is $\tilde{d}_{BC}$; a chute $O_{FBO}$ matching the chute $\tilde{O}_{FBO}$ is arranged on the circle with radius of $R_{FB}=R_M-b_{MBC}/2$ above $F_{ABO}$, wherein the total thickness is $h_{OFB}$ after $O_{FBO}$ and $\tilde{O}_{FBO}$ are combined together; $F_{ABO}$ is fixed onto a bracket Y, and the bracket Y is fixed onto the bottom plate of the generator; in the parts with thickness of $d_{BC}$ close to the magnets on $F_{ABO}$ and $F_{ABl}$, i.e. $R\sim R_M+2\varepsilon_{FBC}$, and $r\sim r_M-2\varepsilon_{FBC}$ regions, n holes through which insulated conducting wires can pass are respectively drilled perpendicular to the ring surfaces; three, four or six rotating shafts $Z_W$ are installed on the circle with radius of $R_{AW}=R_M+R_W>R_{FBO}=R_M+c_B$ on the bottom plate P of the generator, and two identical drive wheels $W_A$, $W_B$ with radius of $R_W$, are respectively installed in the positions corresponding to the magnets $M_A$, $M_B$; the drive wheel $W_A$ is tangential to and in close contact with the outer ring of $M_A$, and $W_B$ is tangential to and in close contact with the outer ring of $M_B$; $M_A$ drives $W_A$, $W_B$ to rotate at the same linear velocity when rotating, $W_B$ drives $M_B$ to rotate at the same linear velocity, and $M_A$, $M_B$ simultaneously rotate at the same angular velocity because outer radii of $M_A$, $M_B$ are identical;

a ring-shaped conducting wire bracket $G_{FBC}$ is made and installed around the magnets $M_B$, $M_C$ through the holes of $F_{ABO}$ and $F_{ABl}$, the side surface radius of the outer ring of $G_{FBC}$ is $R_G=R_M+2\varepsilon_{FBC}$, the side surface radius of the inner ring is $r_G=r_M-2\varepsilon_{FBC}$, both the top frame $G_2$ and the bottom frame $G_1$ are ring planes, the inner radius and outer radius thereof are respectively identical to the side surface radius of the inner ring and the side surface radius of the outer ring, both the distance from $G_1$ to the bottom surface of $M_C$ and the distance from $G_2$ to the top surface of $M_B$ are $\varepsilon_{FBC}$;

staring from the point $A_I$ on the large circle on the magnet $M_B$, one end of the conducting wire $L_{BC}$ passes through the upper ring surface of $M_B$ in the radial direction, passes through the hole 1 of $F_{ABl}$, passes through the lower ring surface of $M_C$ in the radial direction, passes through the hole 1 of $F_{ABO}$, and returns to the point adjacent to $A_I$ the process is repeated, the conducting wire passes through n holes of $F_{ABl}$ and $F_{ABO}$ in sequence, and returns to the large circle on $M_B$; the process may be repeated for many times as required, alternatively, a plurality of conducting wires are simultaneously twined around the bracket $G_{FBC}$, and the two ends of the conducting wires are respectively connected to the wiring posts 1 and 2; no conducting wire twines in the positions where the drive wheels $W_A$, $W_B$ are respectively tangential to $M_A$, $M_B$, so that $W_A$, $W_B$ can be in close contact with $M_A$, $M_B$ respectively and rotate simultaneously;

if the center shaft $A_M$ is driven to rotate by power, the magnets $M_A$, $M_B$, $M_C$, $M_D$ will rotate at the same angular velocity, but the conducting wire is stationary, thus, DC electromotive force is generated at the two ends of the conducting wire, as shown in (1), wherein the scale factor is changed into $k_{11}$;

another mode for implementing the rotation of $M_C$, $M_B$ relative to the magnetic conductive plates $F_{ABl}$ and $F_{ABl}$ is as follows: the thickness of the magnetic conductive plate $F_{ABl}$ at the part of $r\leq r_M-\varepsilon_{FBC}$ is $d_{BC}$, the thickness thereof at the part of $r>r_M-\varepsilon_{FBC}$ is 0, three, four, six or eight rotating shafts with the length of $(a_{MBC}-\varepsilon_{FBC})$ are symmetrically and uniformly fixed onto the inner ring surface of $F_{ABl}$ in the radial direction, and the drive wheel with the diameter of $(d_{BC}-2h_{MBC}-\varepsilon_{FBC})$ is installed on the shaft; and for the magnetic conductive plate $F_{ABO}$, the thickness of $F_{ABl}$, at the part of $R\geq R_M+\varepsilon_{FBC}$ is $d_{BC}$, the thickness of $F_{ABl}$ at the part of $R<R_M+\varepsilon_{FBC}$ is 0, three, four, six or eight rotating shafts with the length of $b_{MBC}-\varepsilon_{FBC}$ are symmetrically and uniformly fixed onto the outer ring surface of $F_{ABl}$ in the radial direction, and the drive wheel with the diameter of $(d_{BC}-2h_{MBC}-\varepsilon_{FBC})$ is installed on the shaft.

The $12^{th}$ form of such DC generator without reversing is as follows: the conducting strip in the conductor loop is stationary, but the magnet rotates; the shape, structure and installation of the magnets and magnetic conductive plates are identical to that of the $11^{th}$ form, and the difference is in that the conducting wires are replaced with the conducting strips; the specific structure is as follows: 2n conducting strips $D_j$, j=1, 2 ... 2n which are identical to the magnets in ring surface and have the thickness of $h_P$ are made, the 1, 3 ... $(2n-1)^{th}$ conducting strips thereof are uniformly arranged between the magnets $M_A$ and $M_B$ by means of corresponding brackets, the 2, 4 ... $2n^{th}$ conducting strips thereof are uniformly arranged between the magnets $M_C$ and $M_D$ by means of corresponding brackets, and the vertical center lines of all conducting strips coincide with the vertical center lines of the magnets; the outer circle edge of the conducting strip $D_1$ is connected to the wiring post 1, the inner circle edge of $D_1$ is connected to the inner circle edge of $D_2$ by a conducting wire passing through the hole 1 of the ring-shaped magnetic conductive plate $F_{ABl}$, the outer circle edge of $D_2$ is connected to the outer circle edge of $D_3$ by a conducting wire passing through the hole 1 of $F_{ABO}$, the inner circle edge of $D_3$ is connected to the inner circle edge of $D_4$ by a conducting wire passing through the hole 2 of $F_{AEl}$, and so on, the inner circle edge of $D_{2n-1}$ is connected to the inner circle edge of $D_{2n}$ by a conducting wire passing through the hole n of $F_{ABl}$, and the outer circle edge of $D_{2n}$ is connected to the wiring post 2; As described in the eleventh form, no conducting wire twines in the positions where the drive wheels $W_A$, $W_B$ are respectively tangential to $M_A$, $M_B$, so that $W_A$, $W_B$ can be in close contact with $M_A$, $M_B$ respectively and rotate simultaneously; and identical to the eleventh form, if the center shaft $A_M$ is driven to rotate by power, the magnets $M_A$, $M_B$, $M_C$, $M_D$ will rotate at the same angular velocity as $A_M$, 2n serial conducting strips perform relative motion of cutting the magnetic line of force relative to the magnets, and DC electromotive force $V_T=V_{AB}+V_{CD}$ is generated, wherein $V_{AB}$, $V_{CD}$ respectively represent the electromotive force generated by the conducting wires between $M_A$, $M_B$ and between $M_C$, $M_D$, $V_{AB}$, $V_{CD}$ are described by (1), wherein the scale factor is changed into $k_{12}$.

The magnets used in such generator are permanent magnets or electromagnets, wherein such electromagnet consists of an excitation coil and an iron core; when this device is used as a generator, there is a need to start the direct current of a battery for excitation in the startup phase; after electricity generation, excitation is performed using the direct current generated by the generator itself; and when this device is used as a motor, there is no need to start a battery.

The above various DC generators may only use a group magnets, and corresponding magnetic conductive plates $F_M$ and frames $P_{FM}$, ring-shaped or cylindrical frames $P_{FM}$ made of nonmagnetic conductive material are only fixed at one side of each magnetic conductive plate, conducting wires pass through the holes of the magnetic conductive plates and then twine around the magnetic conductive plates $F_M$ and the frames $P_{FM}$, $P_{FM}$, are installed adjacent to the magnets, and the rest structures are respectively identical to that of the above various generators.

BRIEF DESCRIPTION OF THE DRAWINGS

FIG. 1-2 is a top view of a ring plate twined by a conducting wire, fixed onto the magnetic conductive plate and made of non-magnetic conductive material of the 1$^{st}$ form of DC generator. In the Figure, 2 represents the conducting wire.

FIG. 2 is a front sectional view of a part of a conducting wire of the 2$^{nd}$ form of DC generator. In the Figure, 5 represents the ring-shaped conducting strip, 6 represents the conducting wire connecting the conducting strips and arranged in the magnetic conductive tube.

FIG. 4-1 is a top sectional view of the arrangement of magnets, conducting wires and magnetic conductive plates of the 5$^{th}$ form of DC generator. In the Figure, 11 represents the conducting wire in the hole of the magnetic conductive plate, in which the current inwards flows, and 12 represents the conducting wire out of the hole of the magnetic conductive plate, in which the current outwards flows; and the conducting wire twines inside and outside the magnetic conductive tube. FIG. 4-2 is a side sectional view of a conducting wire of the 5$^{th}$ form of DC generator. In the Figure, 13 represents the magnetic conductive plate with holes; and 14 represents the conducting wire in the hole of the magnetic conductive plate and out of the hole thereof.

FIG. 6-1 is a front sectional view of the right part of the first form of the 7$^{th}$ form of DC generator. In the Figure, 19 represents the rotating shaft $H_{AI}$, fixed onto the bottom plate $P_C$, $P_C$ being fixed onto the bottom plate P; 20 represents the drive wheel $W_{AH2}$ tangential to the magnet $M_f$, and 21 represents the drive wheel $W_{AH1}$ tangential to the inner ring surface of $C_{AH}$; 22 represents the ring $C_{AH}$ fixed onto the rotating arm and having an inner radius of $r_f$; 23 represents the bearing between the rotating shaft $H_{AI}$ and the bottom plate $P_C$; 24 represents bracket $P_C$ on the bottom plate; 25 represents the support post Z of the conducting wire bracket fixed onto the bottom plate $P_C$; 26 represents the chute between the support post Z and the magnet $M_f$; 27 represents the magnetic conductive plate on the conducting wire bracket; and 28 represents the conducting wire bracket, wherein the dotted portion indicates that there is no magnetic conductive plate and conducting wire in the position where the drive wheel is tangential to the magnet $M_f$.

FIG. 6-2 is a front sectional view of the right part of the second form of the 7$^{th}$ form of DC generator. In the Figure, 29 represents the rotating shaft $H_{AI}$, fixed onto the bottom plate P; 30 represents the drive wheel $W_{AH2}$ tangential to the magnet $M_O$, and 31 represents the drive wheel $W_{AH1}$ tangential to the outer ring surface of $\tilde{C}_{AH}$; 32 represents the ring $\tilde{C}_{AH}$ fixed onto the rotating arm and having an outer radius of $R_O$; 33 represents the bottom plate P; 34 represents the support post Z of the conducting wire bracket fixed onto the bottom plate P; 35 represents chutes and balls between the support post Z and the magnet $M_O$; 36 represents the magnetic conductive plate on the conducting wire bracket, wherein the dotted portion indicates that there is no magnetic conductive plate and conducting wire in the position where the drive wheel is tangential to the magnet $M_f$; and 37 represents the conducting wire.

BEST MODE

Figure 1:
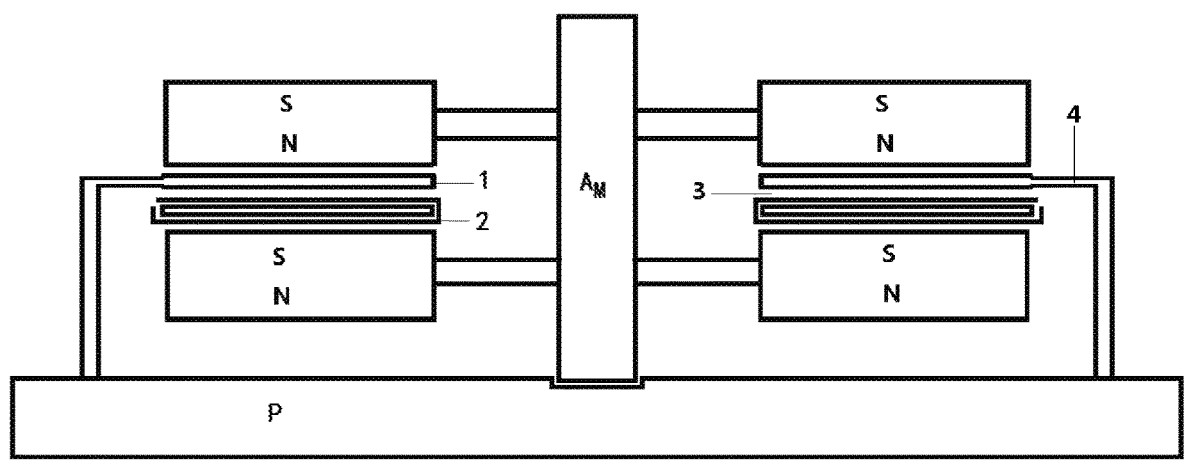
FIG. 1-1 is a front sectional view of a conducting wire on a magnetic conductive plate of the 1$^{st}$ form of DC generator. In the Figure, 1 represents the ring-shaped magnetic conductive plate $F_L$; 2 represents the conducting wire; 3 represents the hole in the magnetic conductive plate; and 4 represents the magnetic conductive plate bracket around with the conducting wire twines.
Figures 1, 2:
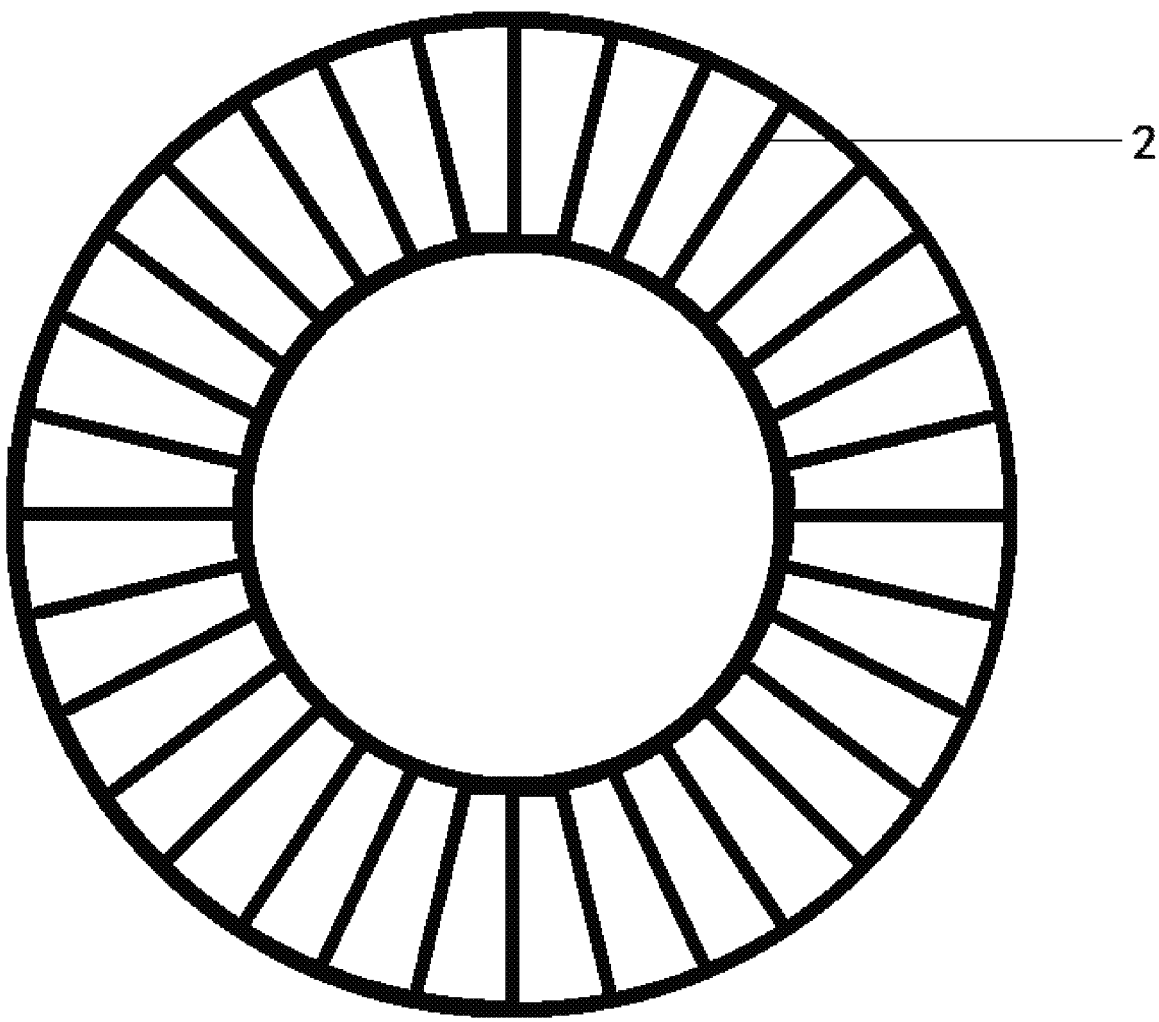
Figure 2:
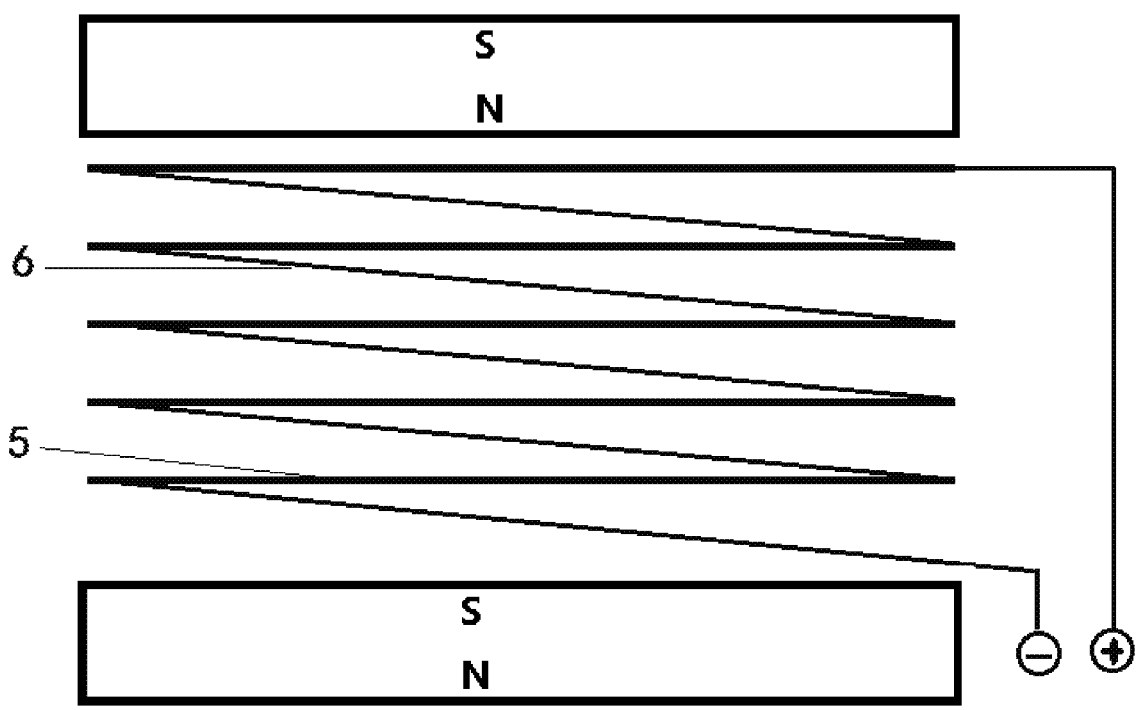
Figure 3:
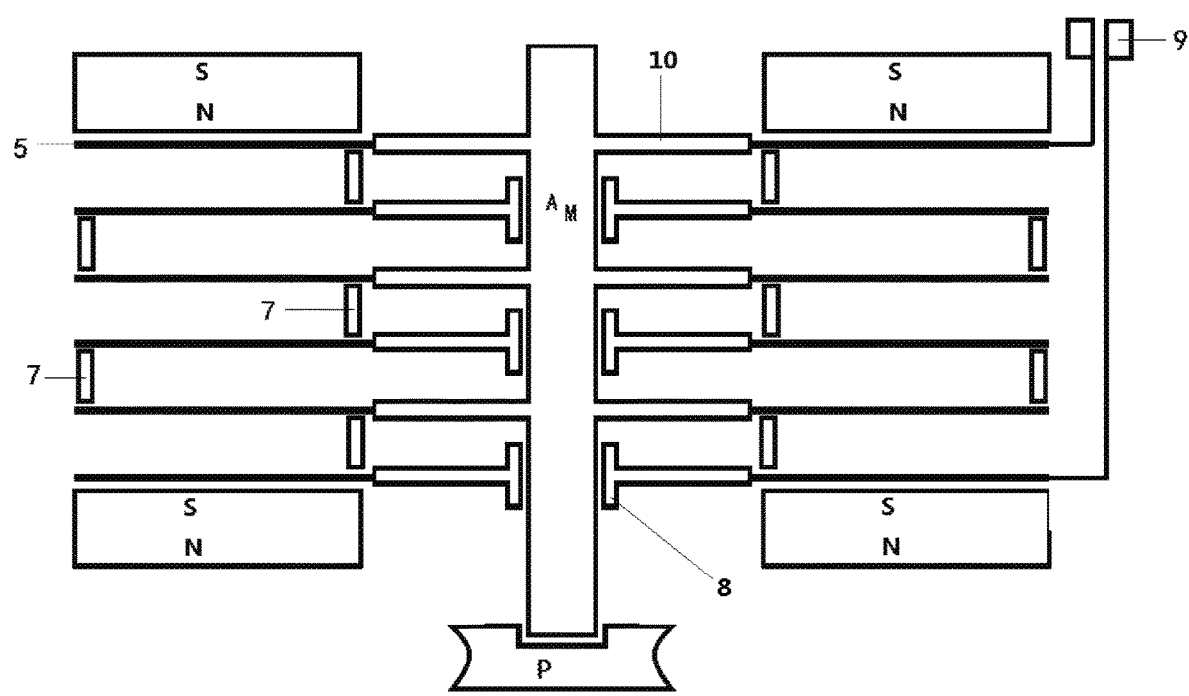
FIG. 3 is a front sectional view of a conducting wire of the 3$^{rd}$ form of DC generator. In the Figure, 5 represents the conducting strip; and 7 represents the electric brush connecting the ring-shaped conducting strips, 8 represents the bearing rotating around the center shaft $A_M$, 9 represents the conducting slip ring, and 10 represents the rotating arm on $A_M$.
Figures 1, 4:
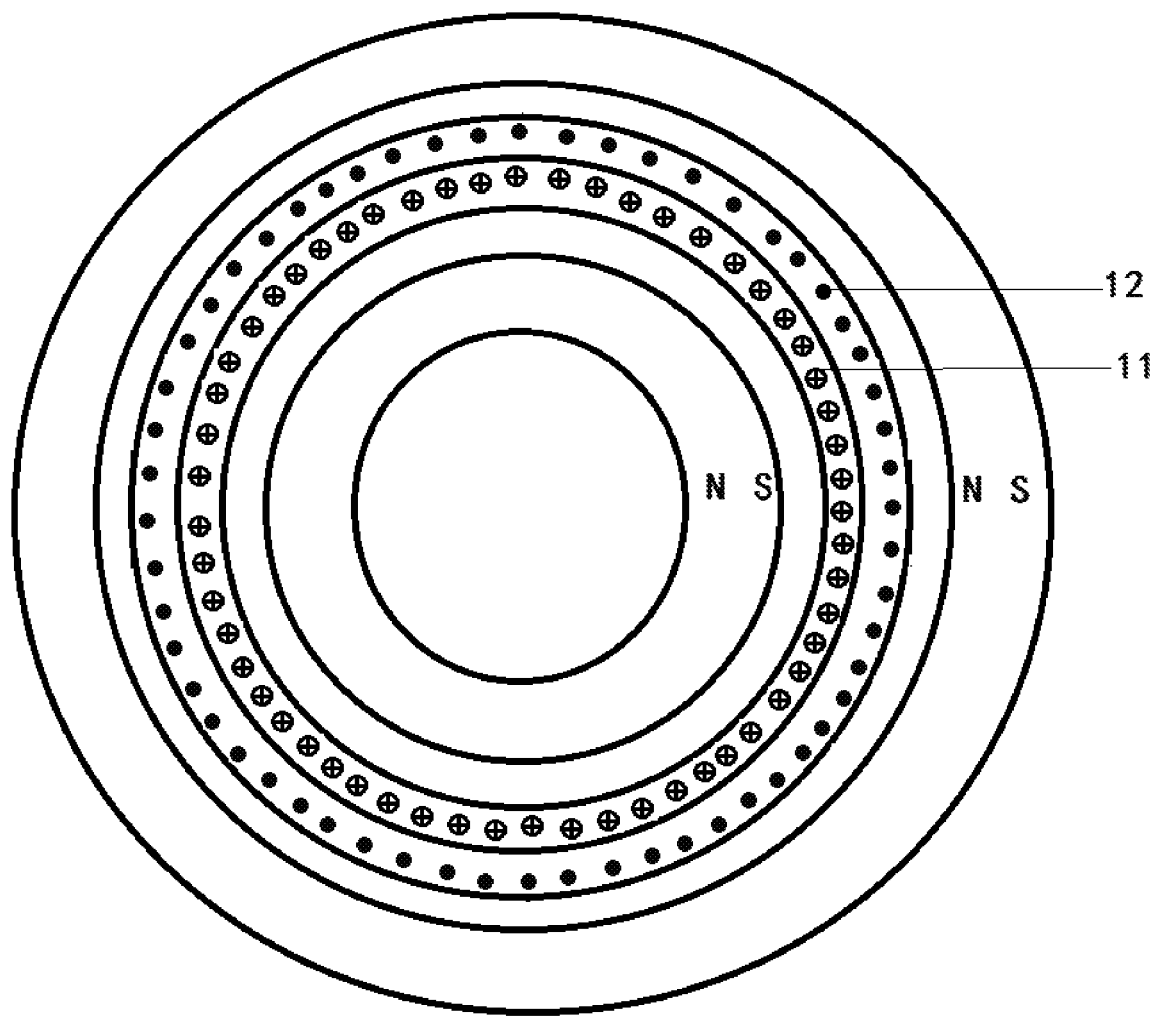
Figures 2, 4:
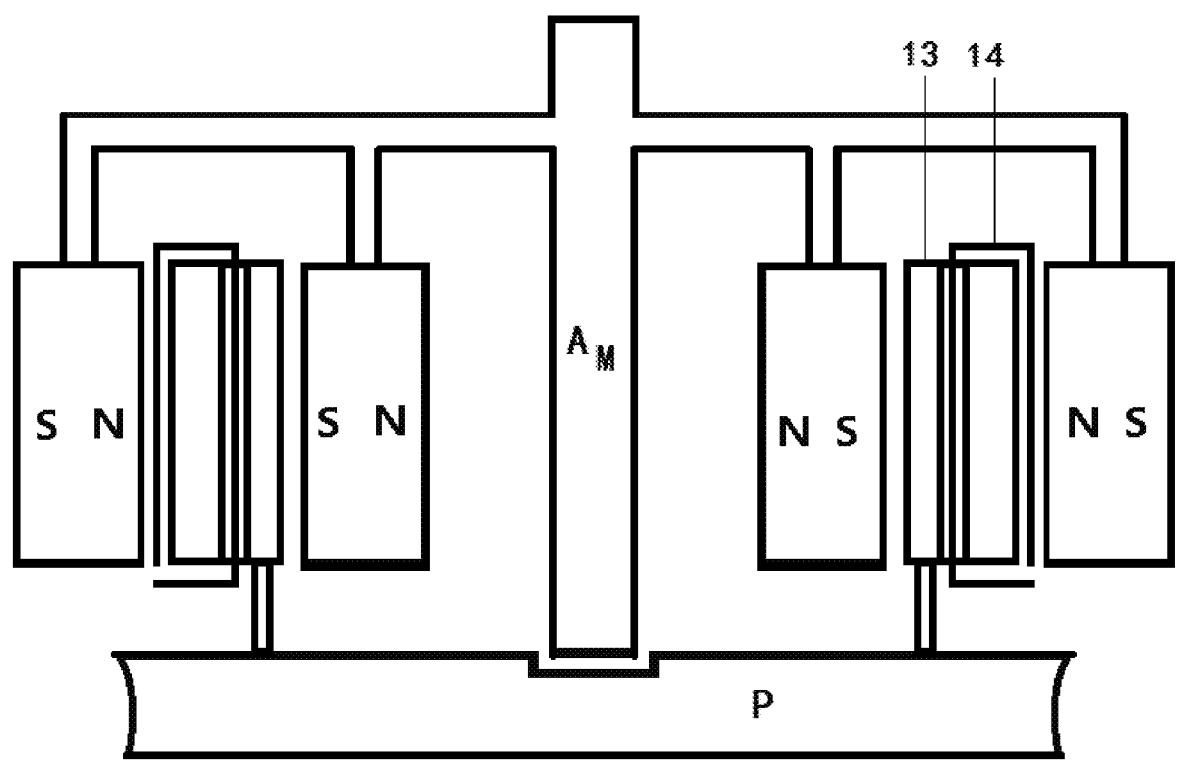
Figure 5:
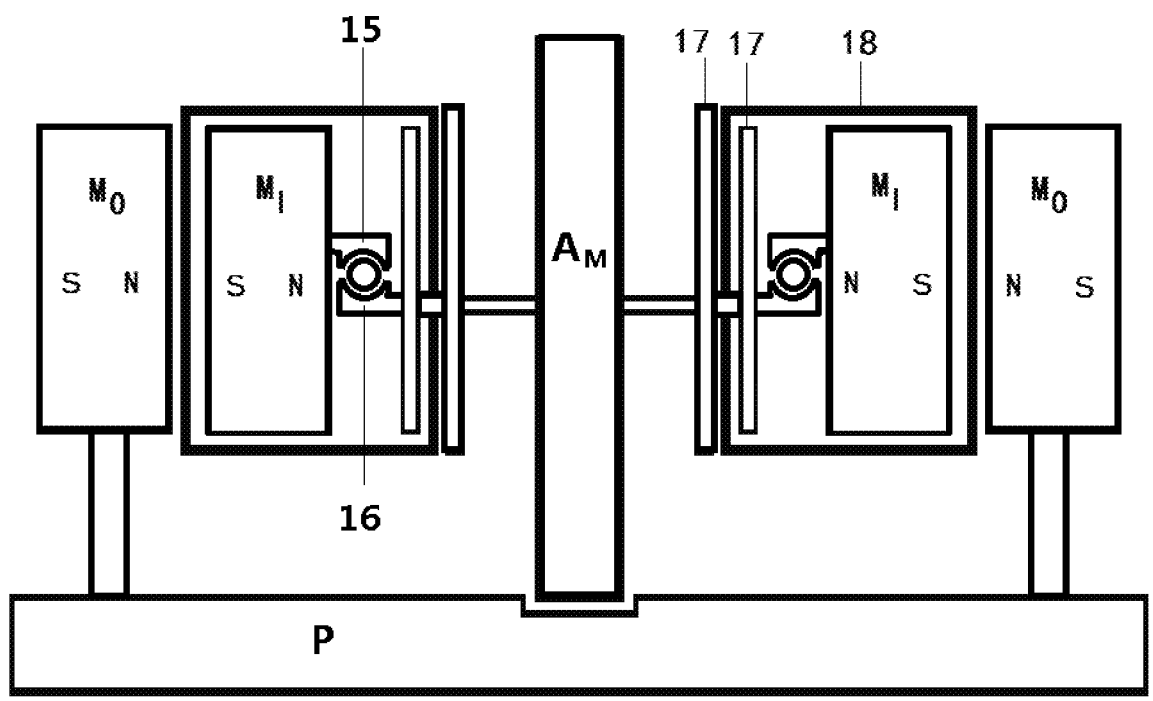
FIG. 5 is a front sectional view of the 6$^{th}$ form of DC generator. In the Figure, 15 represents the chute fixed onto the magnet, and 16 represents the chute fixed onto the conducting wire bracket; 17 represents the magnetic conductive plate fixed onto the center shaft together with the conducting wire bracket; and 18 represents the conducting wire in the hole of the magnetic conductive plate and out of the hole thereof.
Figures 1, 6:
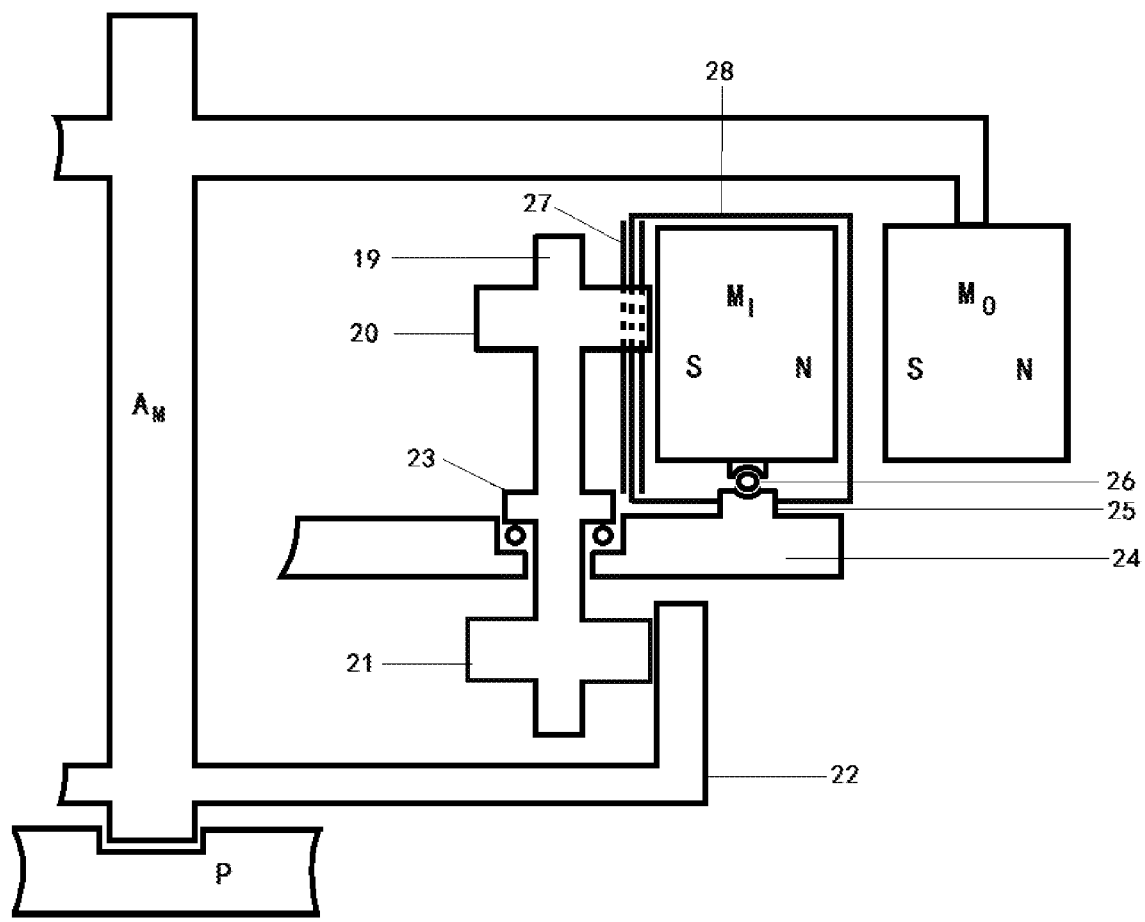
Figures 2, 6:
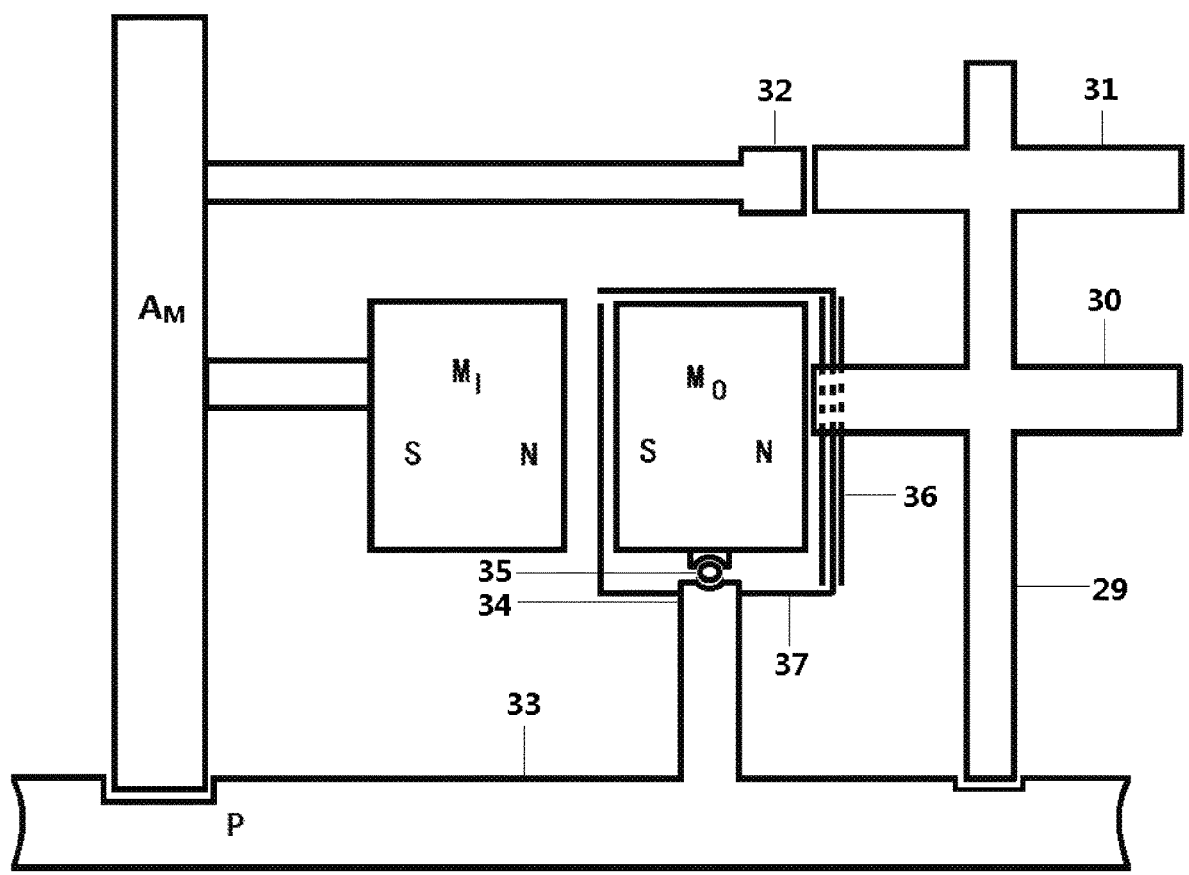
Figure 7:
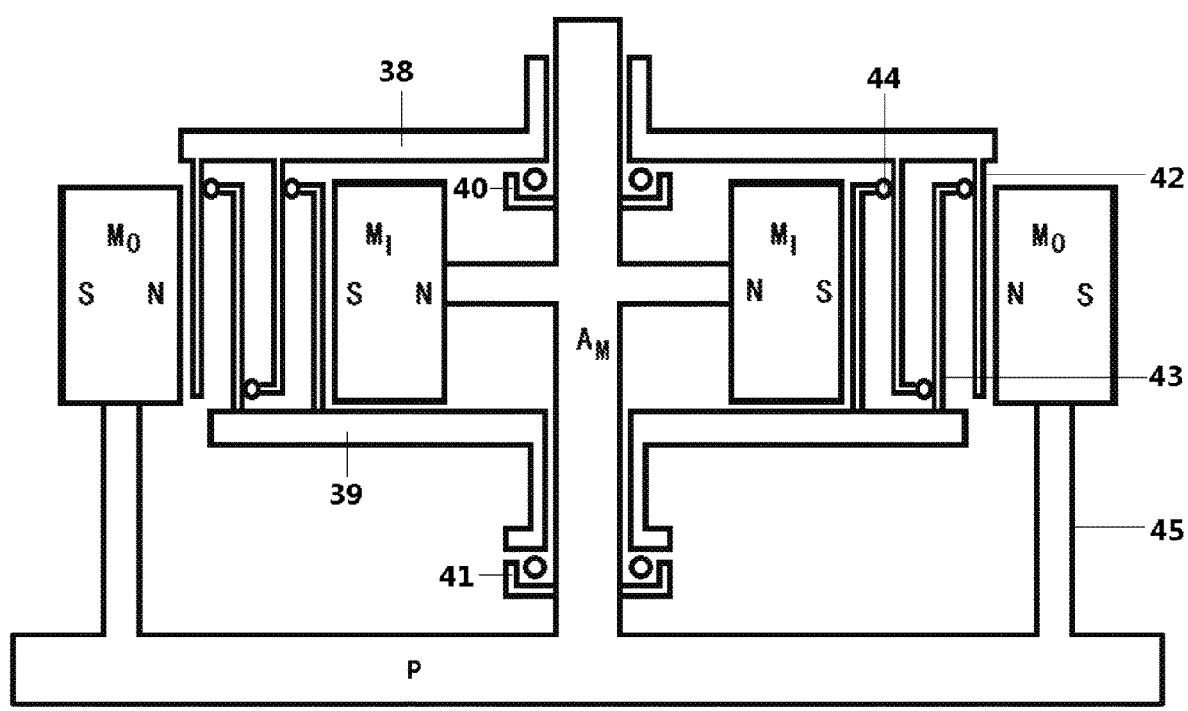
FIG. 7 is a front sectional view of the 8$^{th}$ form of DC generator. In the Figure, 38 and 39 respectively represent rotating arms rotating in opposite directions around the stationary center shaft $A_M$; 40 represents the bearing between the rotating arm 58 and the center shaft $A_M$, and 41 represents the bearing between the rotating arm 39 and the center shaft $A_M$; 42 and 43 respectively represent the ring-shaped conducting strips fixed onto the rotating arms 38 and 39 rotating in opposite directions; 44 represents the conducting wheel or conducting brush between the conducting strips 42 and 43 rotating in opposite directions; and 45 represents the bracket of the magnet $M_O$.
Figure 8:
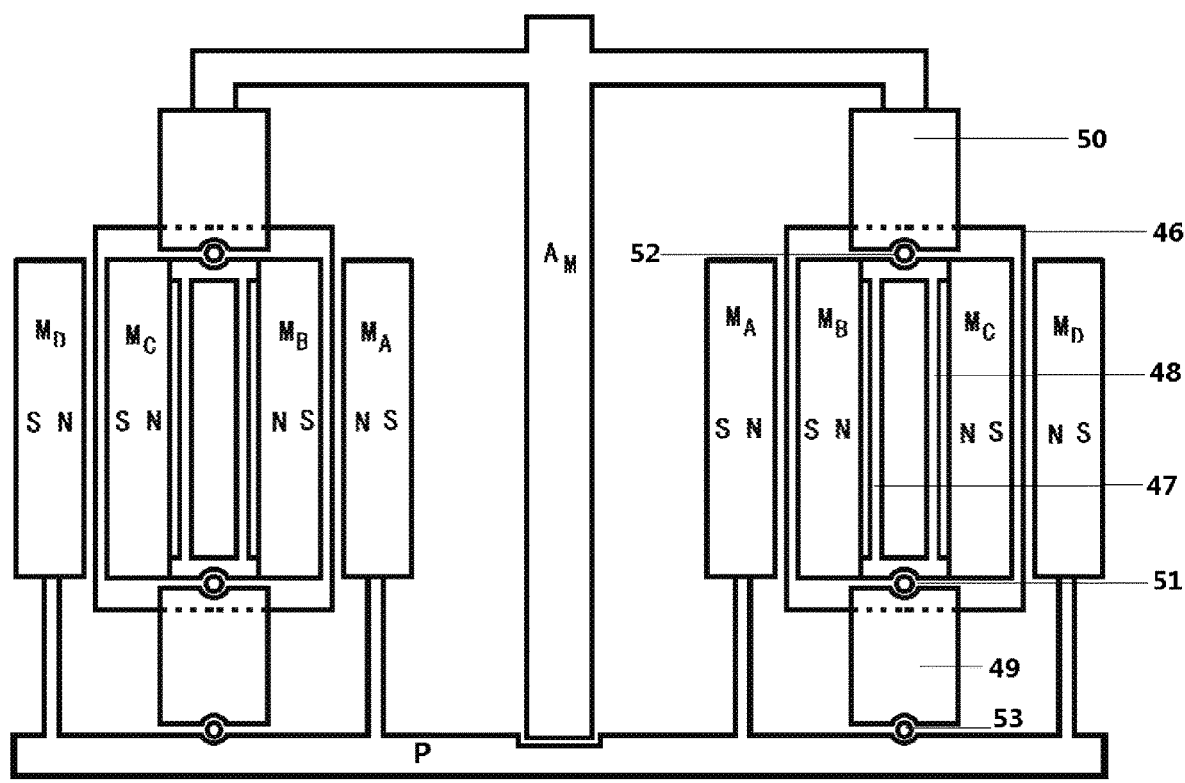
FIG. 8 is a front sectional view of the 9$^{th}$ form of DC generator. In the Figure, 46 represents the ring-shaped conducting wire bracket surrounding the magnets $M_C$ and $M_B$; 47 and 48 respectively represent the magnetic conductive plates closely attached to the magnets and $M_B$; 49 represents the magnetic conductive plates arranged below the magnets $M_C$ and $M_B$, and 50 represents the magnetic conductive plates arranged above the magnets $M_C$ and $M_B$ and fixed onto the rotating arm; 51 and 52 respectively represent chutes between the lower surface and the upper surface of the magnets $M_C$ and $M_B$ and corresponding magnetic conductive plates; and 53 represents chutes between the magnetic conductive plate below the magnets $M_C$ and $M_B$ and the bottom plate.
Figure 9:
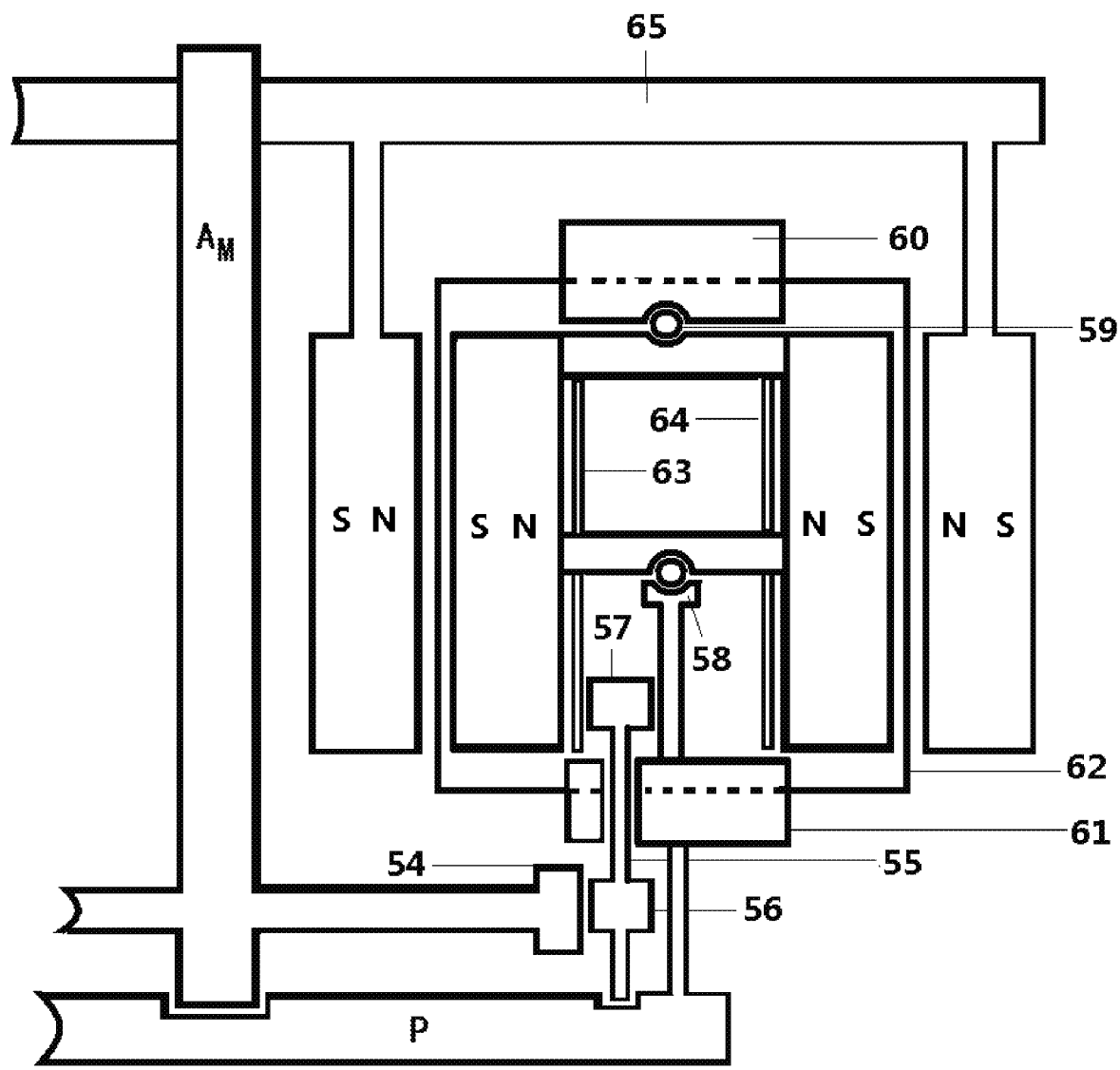
FIG. 9 is a front sectional view of the right part of the 8$^{th}$ form of DC generator. In the Figure, 54 represents the ring $C_{AB}$ fixed onto the rotating arm and having an outer circle radius of $r_{MBO} = (r_{BO} + w_{MBC})$; 55 represents the rotating shaft $H_{AB}$ of the bearing installed on the bottom plate P, $H_{AB}$ passing through the hole having no conducting wire of the magnetic conductive plate below the magnet $M_B$, $M_C$; 56 and 57 respectively represent drive wheels $W_{AB1}$ and $W_{AB2}$ having identical angular velocity fixed onto the rotating shaft $H_{AB}$, wherein $W_{AB1}$ is tangential to the outer ring surface of $C_{AB}$, and $W_{AB2}$ is tangential to the outer ring surface of the magnet $M_B$; 58 represents chutes and balls between the top surface of the conducting wire bracket and the lower surface of the magnetic conductive plate connecting the magnets $M_B$, $M_C$; 59 represents chutes and balls between the magnetic conductive plate connecting the upper parts of the magnets $M_B$, $M_C$ and the magnetic conductive plate fixed onto the conducting wire bracket; 60 represents the magnetic conductive plate arranged above $M_B$, $M_C$, and fixed onto the conducting wire; 61 represents the magnetic conductive plate arranged below $M_B$, $M_C$, fixed onto the bottom plate bracket and fixed together with the conducting wire bracket; 62 represents the conducting wire bracket fixed to the magnetic conductive plate; 63 and 64 respectively represent the magnetic conductive plates closely attached to the outer ring surface of the magnet $M_B$ and the inner ring surface of $M_C$; and 65 represents the rotating arm on the center shaft $A_M$.
Figure 10:
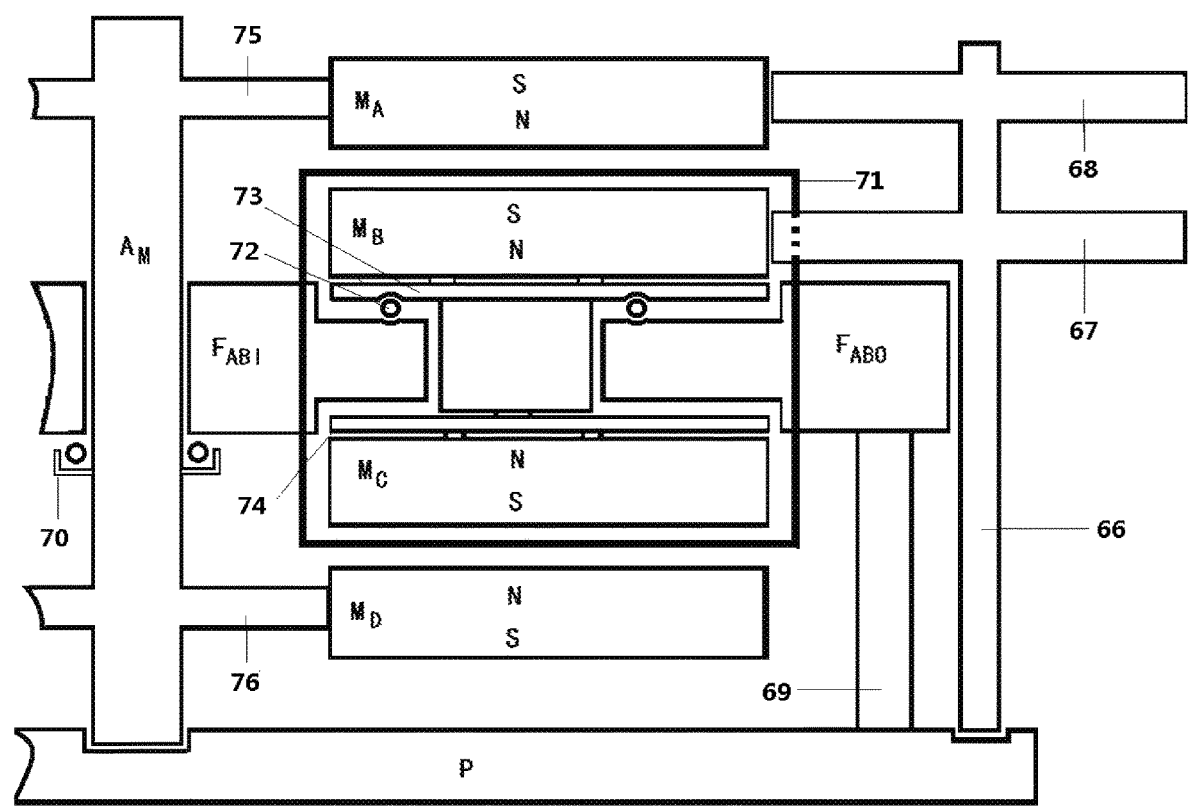
FIG. 10 is a front sectional view of the right part of the 11th form of DC generator. In the Figure, 66 represents the rotating shaft $Z_W$ fixed onto the bottom plate P; 67 and 68 respectively represent the two identical drive wheels $W_A$, $W_B$ having radius of $R_W$ and identical angular velocity corresponding to the magnets $M_A$, $M_B$; the drive wheel $W_A$ is tangential to the outer ring of $M_A$, and $W_B$ is tangential to the outer ring of $M_B$; 69 represents the bracket of the ring-shaped magnetic conductive plate $F_{ABO}$; 70 represents the bearing for installing the magnetic conductive plate $F_{ABI}$ on the center shaft $A_M$; 71 represents the conducting wire bracket fixed onto the magnetic conductive plates $F_{ABO}$ and $F_{ABI}$, wherein the dotted portion indicates that the ring-shaped conducting wire bracket $G_{FBC}$ has no magnetic conductive plate in the position where the drive wheel $W_B$ is tangential to the outer ring of the magnet $M_B$ and has no conducting wire either; 72 represents chutes and balls between the magnetic conductive plate $F_{ABI}$ fixed onto the bearing of $A_M$ and the magnetic conductive plate $\tilde{F}_{MB}$ below the magnet $M_B$; 73 and 74 respectively represent the magnetic conductive plate $\tilde{F}_{MB}$ installed below the magnet $M_B$ and the magnetic conductive plate $\tilde{F}_{MC}$ installed above the magnet $M_C$; 75 and 76 respectively represent the upper and lower rotating arms fixed onto the center shaft $A_M$.

In the first mode, 18 identical small magnets are spliced into two identical ring-shaped magnets $M_A$, $M_B$, each of $M_A$, $M_B$ having a thickness of 30 mm, an inner diameter of 600 mm, an outer diameter of 900 mm, a magnetic field direction perpendicular to ring surfaces, and a magnetic induction intensity of B=0.3 T.

The magnetic conductive plate $F_L$ is made by a DT4C pure iron plate with the thickness of 15 mm, the inner diameter thereof being 600 mm, and the outer diameter being 900 mm. 300 holes with the diameter section of about 3×6 mm² are uniformly drilled in the radial direction, and the whole magnetic conductive plate $F_L$ is completely insulated from the outside. An upper and a lower nylon frames A and B which are identical and hollow are made, the inner diameter and outer diameter thereof being 600 mm and 900 mm respectively, and the height being 170 mm. The two nylon frames are tightly fixed at the two sides of the magnetic conductive plate. In the first mode, the conducting wire of which the surface is provided with an insulation layer passes through the hole of the magnetic conductive plate $F_L$ and twines around the magnetic conductive plate and the outer surface of the nylon frame. Ten conducting wires each having a cross section of 0.5 mm² pass through each hole.

The center shaft $A_M$ is made of stainless steel, is 700 mm in height, and has a diameter of 40 mm. Two groups of identical upper and lower rotating arms may be respectively fixed at the places 100 and 515 mm in height of the center shaft, each group including 6 rotating arms each having an length of 390 mm. $A_M$ is fixed by the bottom plate P and the frame, and the base of $A_M$ is a magnetic suspension bearing. The lower rotating arm is fixed at a place 100 mm in height of $A_M$, and the ring-shaped magnet $M_A$ is fixed onto the lower rotating arm; and the magnetic conductive plate around which the conducting wire twines and the nylon plate A are fixed onto the bottom plate P in a mode of being parallel to the magnet $M_A$ and aligned with the perimeter. The distance between the lower surface of the nylon plate A and the upper surface of $M_A$ is 5 mm.

The magnet $M_B$ and the upper rotating arm are fixed together, and then the center lines of the two coincide. The upper rotating arm onto which the magnet $M_B$ is fixed is fixed at a place 515 mm in height of $A_M$. The distance between the lower surface of $M_B$ and the upper surface of the nylon plate B is 5 mm.

The two ends of the conducting wire are respectively connected to the wiring posts 1, 2.

$A_M$ is driven to rotate by power, and DC electromotive force is generated between the wiring posts 1, 2. If the angular velocity of $A_M$ is 60 revolutions per minute, the DC electromotive force is 39 volt.

The invention claimed is:

1. A DC generator without reversing, comprising: ring-shaped magnets, a magnetic conductive plate which is made of high permeability magnetic material, provided with through holes through which a conducting wire can pass and has a surface completely insulated from the rest part, a conducting wire of which the surface is provided with an insulation layer, drive wheels, a center shaft $A_M$ and a relative slide device;

for each of two identical ring-shaped magnets $M_A$ and $M_B$, the magnetic field direction thereof is perpendicular to the ring surface, the vertical cross section of the ring is rectangular, the thickness, inner ring radius and outer ring radius are $H_m$, $r_M$ and $R_M$ respectively, N and S magnetic poles of $M_A$ and $M_B$ are opposite, the distance is $d_{AB}$, the vertical center lines of ring surfaces of the $M_A$ and $M_B$ coincide, and the $M_A$ and $M_B$ are fixed onto a rotating arm of the center shaft $A_M$;

a shape of the magnetic conductive plate $F_L$ is identical to the ring surface of the ring-shaped magnets, the thickness is $h_F$, n through holes are provided in a radial direction of the $F_L$; ring plates or frames $P_F$ which are made of non-magnetic conductive insulation material are fixed on the two opposite ring surfaces of the magnetic conductive plate $F_L$ having a shape identical to the ring surface of $F_L$ and a thickness of $h_N$; $F_L$ and $P_F$ are combined into a whole $F_L$-$P_F$; the conducting wire passes through the n through holes of the magnetic conductive plate and twines around the $F_L$-$P_F$; the $F_L$-$P_F$ is installed between the magnets $M_A$ and $M_B$ so that the vertical center line of $F_L$-$P_F$ coincides with that of the ring surface of the magnets $M_A$ and $M_B$; and $F_L$-$P_F$ is fixed onto a bracket $P_C$, and the $P_C$ is fixed onto a bottom plate P of the generator; and when the center shaft $A_M$ is driven to rotate by an input power, the magnet rotates, but a coil is stationary, so that DC electromotive force is generated without electric brush.

2. The DC generator of claim 1, wherein a material for the magnetic conductive plate is selected from a group consisting of pure iron, permeability alloy, silicon steel sheet, ferrite, Nd—Fe—B alloy or iron alloy.

3. The DC generator of claim 1, wherein conductors are conducting strips having a same shape with to the ring surfaces of the magnets, and the conducting strips are connected by conducting wires in magnetic conductive tubes;

a conductor loop is formed by the n conducting strips $D_j$, j=1, 2 . . . n which are identical to the ring surfaces of the magnets, are provided with insulation films on the surfaces and have the thickness of $h_D$, and n conducting wires which connect the conducting strips, are encapsulated in the magnetic conductive tube, and are provided with insulation films on the surfaces;

the vertical center lines of the conducting strips coincide with the vertical center lines of the magnets, and are uniformly arranged between the magnets $M_A$ and $M_B$; an outer circle edge of a first conducting strip is connected with a first wiring post; an inner circle edge thereof is connected with the outer circle edge of a second conducting strip by the conducting wire; the inner circle edge of the second conducting strip is connected with the outer circle edge of the third conducting strip by the conducting wire, and so on, the inner circle edge of the $(n-1)^{th}$ conducting strip is connected with the outer circle edge of the $n^{th}$ conducting strip by the conducting wire passing through the $(n-1)^{th}$ magnetic conductive tube, and the inner circle edge of the $n^{th}$ conducting strip is connected with a second wiring post by the conducting wire passing through a $n^{th}$ magnetic conductive tube; and the magnets $M_A$ and $M_B$ are fixed onto a rotating arm of the center shaft $A_M$, and when $A_M$ rotates, the magnets rotate, such that electromotive force is generated without electric brush.

4. The DC generator of claim 1, wherein the ring-shaped magnets are stationary, and the ring-shaped conducting strips perpendicular to the magnetic field rotate in the opposite direction;

The $M_A$ and $M_B$ are fixed onto a bracket thereof; a conductor loop consists of 2n conducting strips $D_j$, j=1, 2 . . . 2n having a same shape with the ring surfaces of the magnets, and conducting wires which connect these conducting strips; the vertical center lines of the conducting strips coincide with the vertical center lines of the magnets and are uniformly arranged between the magnets $M_A$ and $M_B$, the distance between every two vertical center lines is $d_D$, an outer circle edge of the first conducting strip is connected with a first conducting slip ring by a conducting brush, an inner circle edge thereof is connected with the inner circle edge of the second conducting strip by a conducting brush, the outer circle edge of the second conducting strip is connected with the outer circle edge of the third conducting strip by a conducting brush, the inner circle edge of the third conducting strip is connected with the inner circle edge of the fourth conducting strip by a conducting brush, and so on, the inner circle edge of the $(2n-1)^{th}$ conducting strip is connected with the inner circle edge of the $2n^{th}$ conducting strip by a conducting brush, and the outer circle edge of the $2n^{th}$ is connected with a second conducting slip ring by a conducting brush;

n rotating arms $L_i$, i=1, 3 . . . (2n-1) spaced at equal distance are fixed onto the center shaft $A_M$, n $2^{nd}$, $4^{th}$ . . . $2n^{th}$ bearings having equal spacing and sleeved on $A_M$ are fixed between the rotating arms $L_i$, $L_{i+2}$ of $A_M$ and below the $(2n-1)^{th}$ rotating arm; insulated rotating arms $L_j$%, j=2, 4 . . . 2n are fixed onto the bearings; all the distances from the ends of the rotating arms to the axis of $A_M$ are equal; the $1^{st}$, $3^{rd}$, $(2n-1)^{th}$ conducting strips are fixed at the end of the insulated rotating arm $L_i$, and the $2^{rd}$, $4^{th}$ . . . $2n^{th}$ conducting strips are fixed at the end of the insulated rotating arm $L_j$%; and when driven by power, the $1^{st}$, $3^{rd}$, $(2n-1)^{th}$ conducting strips rotate in the opposite direction to the $2^{nd}$, $4^{th}$ . . . $2n^{th}$ conducting strips, and electromotive force is generated between the first wiring post and the second wiring post.

5. The DC generator of claim 1, wherein m magnets are arranged on the center shaft $A_M$ at equal distance such that vertical center lines of ring surfaces of the magnets coincide and magnetic field directions are identical;

magnetic conductive plates $F_{M0}$, $F_{Mm}$ having a same shape with the magnets in ring surface and identical to same in state of motion are respectively provided on the outer sides of the $M_1$, $M_m$, and ring plates $P_N$ are provided onto the magnetic conductive plates $F_{M0}$, $F_{Mm}$;

a conducting wire twining inside a magnetic conductive plate and outside a corresponding ring plate $P_N$ and a wiring post are fixed between two adjacent magnets; and circuits between adjacent magnets are connected in series by a conducting wire in a magnetic conductive tube; in this way, the total electromotive force is the sum of these interval electromotive force.

6. The DC generator of claim 1, wherein the magnets are ring-shaped, the magnetic field is in the radial direction; the ring-shaped magnet rotates around the center shaft, and the conducting wire is stationary without electric brush;

the magnet group of such generator consists of inner and outer ring-shaped magnets $M_O$ and $M_I$ each having ring shape, axial length of $L_M$, magnetic field in radial direction and same direction;

the radius of the small ring of the inner ring magnet $M_I$ is $r_I$, the radius of the large ring thereof is $r_O=r_I+b_I$, where $b_I$ is the width of $M_I$, the radius of the small ring of the outer ring magnet $M_O$ is $R_I$, the radius of the large ring thereof is $R_O=R_I+b_O$, where $b_O$ is the width of $M_O$; $M_I$ is in $M_O$, corresponding end surfaces of $M_I$ and $M_O$ are on the same plane, perpendicular bisectors of ring surfaces coincide, the radial spacing is $S_M=R_I-r_O$, and N, S magnetic poles of the two are opposite; one end surface of the $M_I$ and $M_O$ magnet group is A and the other end surface thereof is B, the end surface of A is fixed onto a rotating arm, $A_M$ is driven to rotate by power, and $M_I$ and $M_O$ synchronously rotate along with $A_M$;

a magnetic conductive cylinder $F_O$, which has length of $L_F=L_M$, wall thickness of $W_F$, inner radius of $r_F>r_O$, and outer radius of $R_F=r_F+W_F<R_I$ is provided; a plurality of holes $H_i$, i=1, 2 . . . n are uniformly provided in the wall of the cylinder $F_O$ along the axial direction; cylinders or cylindrical frames $C_F$ which are made of non-magnetic conductive insulation material and have the thickness of $h_O$ are respectively fixed onto the inner and outer ring surfaces of the magnetic conductive cylinder $F_O$, $F_O$ and $C_F$ are combined into a whole $F_O$-$C_F$, a conducting wire passes through these holes and twines around $F_O$-$C_F$; one end of the conducting wire is fixed onto the first wiring post of an end of A, and the other end is fixed onto the second wiring post at the end of A;

$F_O$-$C_F$ around which the conducting wire twines is installed between the magnets $M_I$ and $M_O$, so that two end surfaces of the cylinder and two end surfaces of the magnet are on the same plane respectively and $F_O$-$C_F$ can freely rotate between $M_I$ and $M_O$, and then $F_O$-$C_F$ is fixed onto a corresponding bracket which is fixed onto the bottom plate P; and when the magnet is driven to rotate by power, and DC electromotive force is generated at both ends of the conducting wire.

7. The DC generator of claim 6, wherein
a ring-shaped chute $O_I$ with a downward opening is fixed onto the inner ring surface of the magnet $M_I$, where the outer radius of $O_I$ is: $r_\infty = r_I$, the inner radius is: $r_O = r_I - b_O$, $b_O$ is the width of $O_I$, and the radius of circle corresponding to the midpoint of the cross section of $O_I$ is: $r_{OM} = r_I - b_O/2$;

the ring-shaped conducting wire bracket $F_C$ surrounds the magnet $M_I$, and $F_C$ consists of inner and outer ring plates, a bottom frame and a top frame; the inner ring plate is a magnetic conductive plate $F_M$, and $F_M$ is provided therein with a plurality of holes which are parallel to the axial direction thereof and through which conducting wires can pass; the outer radius of $F_M$ is: $r_{FMD} = r_O - \varepsilon_{FMD}$, where $\varepsilon_{FMD}$ is the clearance between $F_M$ and the chute $O_I$, the inner radius is: $r_{FM} = r_O - w_{FM}$, where $w_{FM}$ is the thickness of $F_M$; the inner radius and outer radius of the outer ring plate of $F_C$ are $r_{FO} = r_O + \varepsilon_{FM}$ and $r_{FOO} = r_{FO} + w_{FO} < R_I$ respectively, where $w_{FO}$ is the thickness of the outer ring of $F_C$, the length of $F_C$ is: $L_F = L_M + 2w_F + 2\varepsilon_{FM}$, where $w_F$ is the thickness of the top frame and the bottom frame of $F_C$, and $\varepsilon_{FM}$ is the clearance between $F_C$ and the magnet $M_I$; the conducting wire passes through the holes of the magnetic conductive plate $F_M$ and twines around the conducting wire bracket $F_C$, and the two ends of the conducting wire are respectively connected to a first slip ring and a second slip ring by electric brushes;

three, four or six identical rotating arms perpendicular to the center shaft are symmetrically fixed onto the center shaft $A_M$; these rotating arms are fixed with a bracket $F_C$ and a chute $O_I\%$ having a midpoint of the cross section on the circle with the radius of $r_{AM} = r_{OM}$, having inner radius and outer radius of $r_{AM} = r_{FMD}$, $r_{AMD} = r_I - \varepsilon_{FMD}$ respectively, having an upward opening and matching the chute $O_I$ $O_I\%$, $O_I\%$ is in $F_C$ and is fixed onto the outer ring surface of the magnetic conductive plate $F_M$, balls are arranged between the chutes $O_I$ and $O_I\%$, and $O_I$ is buckled on $O_I\%$; $O_I$ and the magnet $M_I$ carried thereby can freely rotate on $O_I\%$ around $A_M$; the center shaft $A_M$ of the magnet is also a center shaft of $F_C$;

the balls are placed in the chute $O_I\%$, the magnet $M_I$ is inserted in $F_C$, the chute $O_I$ fixed onto $M_I$ is made to fall on these balls, and the top frame is fixed onto $F_C$;

the conducting wire is made to pass through the top frame to the magnetic conductive plate $F_M$ of the inner ring of $F_C$ from the point A on the outer side of the top of $F_C$, pass through the small holes of $F_M$ to the bottom of $F_C$, pass through the bottom frame to the outer ring surface of $F_C$, pass through the outer ring surface of $F_C$, and return to the point adjacent to the point A on the outer side of the top of $F_C$; the process is repeated for many times, the conducting wire is fully arranged on the outer ring surface of $F_C$, and then all parts of the conducting wire are respectively fixed onto various parts in $F_C$; and the center shaft $A_M$ is driven to rotate by power, $F_C$ simultaneously rotates along with same, the magnet $M_I$ is stationary, the conducting wire which twines around $F_C$ and the ring rotates in the single direction of cutting the magnetic line of force along with same, the conducting wire passing through the small holes formed in the high permeability material from the inner ring does not cut the magnetic line of force, and DC electromotive force is generated at the two ends of the conducting wire.

8. The DC generator of claim 7, wherein a position of the conducting wire bracket $F_C$ is fixed and the $F_C$ is disconnected with the center shaft $A_M$; the magnet rotates along with the $A_M$;

three, four or six identical support posts Z parallel to $A_M$ are uniformly and symmetrically fixed onto the circle taking the axis of $A_M$ as a center of a circle and taking $r_a = r_I + b_I/2$ as a radius on the bracket $P_C$ of the bottom plane P of the generator, the support posts Z pass through the bottom frame of the conducting wire bracket $F_C$ and $F_C$ is fixed onto the support posts, a chute $O_I\%$ having a cross section in small semicircle shape, an upward opening and filled with balls is fixed onto the top of each of the support posts Z; a chute $O_I$ with a downward opening matching the chute $O_I\%$ on the support posts Z is fixed onto the circle taking $r_a = r_I + b_I/2$ as a radius on the bottom surface of $M_I$, and $O_I$ is buckled on $O_I\%$; in this way, $M_I$ is supported by Z, and $M_I$ is enabled to freely rotate on $O_I\%$ around $A_M$; and $W_{AH2}$ is enabled to be tangential to and in close contact with the inner ring surface of $M_I$;

three, four or six identical rotating shafts $H_{AI}$ parallel to $A_M$ are uniformly and symmetrically fixed onto the circle taking $r_A = r_I - r_W$ as a radius on $P_C$, where $r_W$ represents a distance from the center of each of the rotating shafts $H_{AI}$ to the inner ring surface of the magnet $M_I$; bearings are arranged between $H_{AI}$ and the bracket $P_C$, so that $H_{AI}$ can freely rotate relative to $P_C$; the lengths of the rotating shafts $H_{AI}$ below and above $P_C$ are $L_{H1}$, $L_{H2} < L_M$ respectively, and two identical drive wheels $W_{AH2}$ and $W_{AH1}$ having radius of $r_W$ are respectively fixed onto the parts located below and above the bracket $P_C$ on the shafts $H_{AI}$; a clearance with a height of $h_{HP}$ is arranged between the bottom surface of $H_{AI}$ and the bottom plane P of the generator; a rotating arm is fixed at the position corresponding to the clearance of $h_{HP}$ between $H_{AI}$ and P on the lower part of the center shaft $A_M$, and a ring $C_{AH}$ having inner radius of $r_I$ is fixed onto the rotating arm; $W_{AH1}$ is tangential to the inner ring surface of $C_{AH}$, and $W_{AH2}$ is tangential to the inner ring surface of the magnet $M_I$; because the position where the drive wheel $W_{AI2}$ is tangential to the inner ring surface of the magnet $M_I$ is the position where the clearance of the ring-shaped magnetic conductive plate is located, no conducting wire passes through; in this way, $C_{AH}$ can drive $W_{AH1}$ and $W_{AH2}$ to rotate at the same linear velocity, thereby driving $M_I$ to rotate;

the conducting wire is twined around the conducting wire bracket $F_C\%$ without electric brush, and two ends of the conducting wire are connected to the wiring posts; the magnet $M_O$ is fixed onto the upper rotating arm of $A_M$; when $A_M$ is driven to rotate by power, $A_M$ drives the ring $C_{AH}$, $W_{AI1}$, $W_{AI2}$ and $M_I$ to rotate, because $W_{AI1}$ is identical to $W_{AI1}$ in radius, $C_{AH}$, is identical to $M_I$ in inner diameter and $M_O$ is fixed onto the rotating arm of $A_M$, the angular velocities of $M_I$ and $M_O$ are identical to that of $A_M$ respectively and the conducting wire is stationary; the conducting wire performs relative motion of cutting the magnetic line of force; because a magnetic circuit is changed by the magnetic conductive plate having holes of the inner ring of $F_C\%$, and no or few magnetic lines of force in the inner ring of $F_C\%$ are cut by the conducting wire, DC electromotive force is generated at the two ends of the conducting wire.

9. The DC generator of claim 1, the ring-shaped magnets $M_I$, $M_O$ with the magnetic field in radial direction are stationary, and ring-shaped conducting strips rotate around $A_M$ in the opposite direction with electric brushes;

the center shaft $A_M$ does not rotate, and the magnets $M_I$, $M_O$ are respectively fixed onto the center shaft $A_M$ and the bottom plate P; n=2n %, ring-shaped conducting strips having the thickness of $h_C$, height of $L_M$, and radii of $R_{C1}=r_O+s_m$, $R_{C2}=r_O+h_C+2s_m \ldots R_{On}=r_O+(n-1)h_C+ns_m$ respectively are arranged between $M_I$, $M_O$, where $s_m$ represents spacing between the adjacent ring-shaped conducting strips and ring-shaped conducting strips 1, n and adjacent magnets $M_I$ and $M_O$ respectively, $R_I-r_O=nh_c+(n+1)s_m$, $r_O$ and $R_I$ respectively represent the radius of the outer ring surface of the magnet $M_I$ and the radius of the inner ring surface of the magnet $M_O$; the center lines of the ring surfaces of the n ring-shaped conducting strips coincide, the conducting strips are arranged from inside to the outside in accordance with the order of radii from small to large, two end surfaces of the n conducting rings are respectively arranged on the planes of the two end surfaces of the ring-shaped magnets;

the upper part and the lower part of the $j^{th}$ conducting ring are $A_j$, $B_j$ respectively, $Q_k$, k=1, 2 . . . (n+1) represents (n+1) conducting pulleys or conducting brushes; the upper part $A_I$ of the $1^{st}$ conducting ring is connected to the first conducting slip ring by $Q_1$, $B_1$, $B_2$ are communicated by $Q_2$, $A_2$, $A_3$ are communicated by $Q_3$, $B_3$, $B_4$ are communicated by $Q_4$, and so on, $B_{(n-1)}$, $B_n$ are communicated by $Q_n$, and the upper part $A_n$ of the $n^{th}$ conducting ring is connected to the second conducting slip ring by $Q_{(n+1)}$;

upper and lower sleeves $A_{M1}\%$, $A_{M2}\%$ are provided on the center shaft $A_M$, and $A_{M1}\%$, $A_{M2}\%$ are driven to rotate around $A_M$ by power in opposite directions; the upper parts of the $1^{st}$, the $3^{rd}$ . . . the $(2n\%-1)^{th}$ conducting rings are fixed onto the rotating arms of $A_{M1}\%$ located above the conducting rings, and the $2^{nd}$, the $4^{th}$ . . . the $2n\%^{th}$ conducting rings are fixed onto the rotating arms of $A_{M2}\%$ located below the conducting rings; and when $A_{M1}\%$, $A_{M2}\%$ are driven to rotate by power in the opposite direction, DC electromotive force is generated at the two ends of the conducting wire.

10. The DC generator of claim 1, wherein the magnets are stationary, but the conducting wire rotates; four ring-shaped magnets $M_A$, $M_B$, $M_C$, $M_D$ with the magnetic field in radial direction have the same length and ring width which are $L_M$, $b_M$ respectively, and the inner radius and outer radius of $r_{AI}$, $r_{AO}$, $r_{BI}$, $r_{BO}$, $R_a$, $R_{OO}$, $R_{DI}$, $R_{DO}$, $r_{BI}-r_{AO}=R_{DI}-E_{OO}=a$, $R_a-r_{BO}=b$, wherein the magnetic field directions of the magnets $M_A$, $M_B$ are identical, the magnetic field directions of $M_C$, $M_D$ are identical as well, but the magnetic field directions of $M_A$, $M_B$ are opposite to that of $M_C$, $M_D$; the four magnets are arranged in the order of $M_A$, $M_B$, $M_C$, $M_D$, from inside to the outside by taking the center shaft $A_M$ as a center, wherein the axial center lines of the four magnets coincide, the upper end surfaces are on the same plane, and the lower end surfaces are also on the same plane;

the ring-shaped magnetic conductive plate $F_{MB}$ having inner radius of $r_{MBI}=r_{BO}$, outer radius of $r_{MBO}=r_{BO}+w_{MBC}$ and height of $L_{MBC}=L_M$ is fixed onto the large ring surface of $M_B$, where $w_{MBC}$ represents the width of $F_{MB}$, and the ring-shaped magnetic conductive plate $F_{MC}$ having outer radius of $R_{MCO}=R_a$, inner radius of $R_{MCI}=R_a-w_{MBC}$ and height of $L_{MBC}=L_M$ is fixed onto the small ring surface of $M_C$;

the magnets $M_B$, $M_C$ are connected together by the ring $C_{BC1}$ fixed at the bottom of the two magnets and the ring $C_{BC2}$, fixed at the top thereof; $C_{BC1}$ is identical to $C_{BC2}$ in inner radius $r_{MBO}$, outer radius $R_{MCI}$ and thickness $h_O$; the circle with radius of $R_{BC}$ which is below $C_{BC1}$ and above $C_{BC2}$ is respectively provided with chutes $O_{BC1}$, $O_{BC2}$ of which the cross sections are in identical small semicircle shape, $O_{BC1}$ having a downward opening, and $O_{BC2}$ having an upward opening;

the ring-shaped conducting wire bracket $F_{BC}$ is fixed around the inner side surface of the magnet $M_B$ the outer side surface of $M_C$, the upper surface and lower surface of $M_B$, $M_C$, wherein $F_{BC}$ consists of an inner ring surface, an outer ring surface, a bottom frame $E_1\%$ and a top frame $E_2\%$; the inner ring surface radius and outer ring surface radius of $F_{BC}$ are $r_{FBC}=r_{BI}-\varepsilon_{FBC}$ and $R_{FBC}=R_{OO}+\varepsilon_{FBC}$ respectively, and the height thereof is $L_M+2\varepsilon_{FBC}$; $\varepsilon_{FBC}$ represents the clearance between the inner ring surface of $M_B$, the outer ring surface of $M_C$, and the upper surface and lower surface of $M_B$ and $M_C$, and the conducting wires installed on corresponding parts of $F_{BC}$; the middle parts of the bottom frame $E_1\%$ and the top frame $E_2\%$ are respectively provided with magnetic conductive plates $E_1$ and $E_2$, the top surface of $E_1\%$ and the top surface of $E_1$ are arranged on the same plane, the bottom surface of $E_2\%$ and the bottom surface of $E_2$ are arranged on the same plane, and holes in radial direction are provided in $E_1$ and $E_2$;

the circle with radius of $R_{BC}$ which is above $E_1$ and below $E_2$ is respectively provided thereon with chutes $O_{BC1}\%$, $O_{BC2}\%$ matching the chutes $O_{BC1}$, $O_{BC2}$, $O_{BC1}\%$ having an upward opening, and $O_{BC2}\%$ having a downward opening; balls are arranged between $O_{BC1}$ and $O_{BC1}\%$ and between $O_{BC2}$ and $O_{BC2}\%$; the total height of $O_{BC1}\%$ filled with balls and $O_{BC1}$ is $h_{BC}+\varepsilon_{FBC}$, and the total height of $O_{BC2}$ filled with balls and $O_{BC2}\%$ is also $h_{BC}+\varepsilon_{FBC}$; $E_2$ is fixed onto the rotating arm of $A_M$, the perpendicular bisector of $E_2$ coincides with that of the ring surface of the magnet, the chute $O_{BC2}\%$ below $E_2$ is buckled on the chute $O_{BC2}$ filled with balls;

the circle with radius of $R_{BC}$ below $E_1$ is provided thereon with a chute $O_{BC1}\%$ which has a downward opening and is identical to $O_{XBC1}\%$ in other part; the bottom plate P is provided thereon with a chute $O_{XBC1}$ with an upward opening matching $O_{XBC1}\%$, and balls are arranged between $O_{XBC1}\%$ and $O_{XBC1}$; in this way, $E_1$ can drive the bracket $F_{BC}$ to freely rotate on the bottom plate P around $A_M$;

passing through the holes of $E_1$ and $E_2$, the conducting wire is twined around the conducting wire bracket $F_{BC}$, one end of the conducting wire is connected to a first conducting slip ring by an electric brush, and the other end thereof is connected to the second slip ring by an electric brush; the magnets $M_A$ and $M_D$ are fixed onto the bottom plane P of the generator, and $E_2$ of $F_{BC}$ is fixed onto the rotating arm of $A_M$; and the center shaft is driven to rotate by power, and DC electromotive force is generated.

11. The DC generator of claim 10, wherein $F_{BC}$ is not fixed onto the rotating arm of $A_M$, but the magnets $M_A$, $M_D$ are fixed onto the rotating arm, $M_A$, $M_D$ directly rotate along with the center shaft, and the magnets $M_B$, $M_C$ synchronously rotate together with $M_A$, $M_D$ through a drive device $G_{FBC}\%$;

three, four or six identical support posts $Z_{BC}$ parallel to $A_M$ are uniformly and symmetrically fixed onto the circle taking the axis of $A_M$ as a center of a circle and taking $R_{BC}\%$, $R_a>R_{BC}\geq(r_{BO}+R_a)/2$, as a radius on the bottom plane P, the support posts $Z_{BC}$ pass through the bottom frame $E_1$% of $F_{BC}$, and $E_1$ and the bracket $F_{BC}$ are fixed onto the support posts $Z_{BC}$; the distance from the top surface of these support posts to the upper surface of the bottom frame $E_1$% of $F_{BC}$ is $h_Z$, and a ring plate $C_Z$ with radius of $R_{BC}$% is fixed onto the support posts; the circle with radius of $R_{BC}$% which is above $C_Z$ and below the top frame $E_2$% is respectively provided thereon with chutes $O_{BC1}$% and $O_{BC2}$% on the bottom plane P; rings $C_{BC1}$%, $C_{BC2}$ having inner diameter of $r_{MBO}$, outer diameter of $R_{MCI}$ and thickness of $h_O$ are respectively fixed between the magnets $M_B$ and $M_C$ at a position $h_{BC}$ ($h_{BC}>h_Z$) away from the bottom surface thereof and a position $h_O$ away from the top surface thereof, the circle with radius of $R_{BC}$% which is below $C_{BC1}$% and above $C_{BC2}$ is respectively provided thereon with chutes $O_{BC1}$, $O_{BC2}$ of which the cross sections are in identical small semicircle shape matching the chutes $O_{BC1}$% and $O_{BC2}$%, $O_{BC1}$ having a downward opening, and $O_{BC2}$ having an upward opening; balls are arranged between $O_{BC1}$ and $O_{BC1}$% and between $O_{BC2}$% and $O_{BC2}$; in this way, the magnets $M_B$ and $M_c$ are fixed together by $C_{BC1}$%, $C_{BC2}$%, and are driven by the drive device $G_{FBC}$% to rotate on the chutes $O_{BC1}$% and $O_{BC2}$% along with the center shaft $A_M$, but the conducting wire bracket $F_{BC}$ is stationary;

the drive device $G_{FBC}$% is located between the ring plate $C_Z$ and the bottom surface of $M_B$, $M_C$, has a structure as follows: three, four or six identical rotating shafts $H_{AB}$ parallel to $A_M$ are uniformly and symmetrically fixed onto the circle taking the axis of $A_M$ as a center of a circle and taking $r_{AH}=(r_{BO}+w_{MBC})+r_{HBF}$ as a radius on the bottom plate P, where $r_{HBF}$ represents the distance from the center of the support post $H_{AB}$ to the outer ring surface of the magnetic conductive plate $F_{MB}$ of the magnet $M_B$, $r_{HBF}<[R_{BC}\%-(r_{BO}+w_{MBC})]/2$, and $w_{MBC}$ represents the width of $F_{MB}$; bearings are arranged between $H_{AB}$ and the bottom plate P, so that $H_{AB}$ can freely rotate relative to P; the distance between the top surface of $H_{AB}$ and the upper surface of the bottom frame $F_{BC}$ of $E_1$% is $h_{AB2}$, $h_{AB2}<h_Z$; two identical drive wheels $W_{AB1}$ and $W_{AB2}$ with the radius of $r_{HBF}$ are respectively fixed in the positions $h_{AB2}$ away from the upper surface and $h_{AB1}$ away from the lower surface of the bottom frame $f_{BC}$% of $E_1$% on the shaft $H_{AB}$;

a rotating arm is fixed in a position corresponding to the drive wheel $W_{AB1}$ on the center shaft $A_M$, and a ring $C_{AB}$ with outer circle radius of $r_{MBO}=(r_{BO}+w_{MBC})$ is fixed onto the rotating arm; $W_{AB1}$ is tangential to and in close contact with the outer ring surface of $C_{AB}$, $W_{AB2}$ is tangential to and in close contact with the outer ring surface of the magnetic conductive plate $F_{MB}$ of $M_B$, and $C_{AB}$ can drive $W_{AB1}$ and $W_{AB2}$ to rotate at the same linear velocity, thereby driving $M_B$ and $M_C$ fixed together to rotate along with the center shaft $A_M$; and $A_M$ is driven to rotate by power, and the electromotive force is generated.

12. The DC generator of claim 1, wherein the conducting wire in the conducting wire loop is stationary, but the magnet rotates; the magnet group consists of four ring-shaped magnets $M_A$, $M_B$, $M_c$, $M_D$ and perpendicular to the ring surface in magnetic field direction, the perpendicular bisectors thereof respectively coincide with the center line of $A_M$, the magnets are arranged from top to bottom in the order of $M_A$, $M_B$, $M_C$, $M_D$, wherein $M_A$ is identical to $M_B$ in magnetic field direction, the distance therebetween is $d_{AB}$, $M_C$ is identical to $M_D$ in magnetic field direction, the distance therebetween is $d_{CD}=d_{AB}$, $M_C$ and $M_D$ are opposite to $M_A$ and $M_B$ in magnetic field direction, the distance between $M_B$, $M_C$ is $d_{BC}$, and ring-shaped magnetic conductive plates are arranged between $M_B$, $M_C$;

the ring-shaped magnetic conductive plates $F_{PB}$, and $F_{PC}$ are respectively fixed below the magnet $M_B$ and above $M_C$, $F_{FB}$ is identical to $F_{PC}$, the thickness is $h_{MBC}$, and the inner circle radius and the outer circle radius are $r_{MBC}=r_M$, $R_{MBC}=R_M$ respectively; the distance between the opposite surfaces of $F_{PB}$ and $F_{PC}$ is $d_{MBC}=d_{BC}-2h_{MBC}$, and the ring-shaped magnetic conductive plate $F_{PB}$ with the thickness of $d_{MBC}$ and inner circle radius and outer circle radius of $r_{MBC}\%=r_M+a_{MBC}$, $R_{MBC}\%=R_M-b_{MBC}$ respectively is added between $F_{FB}$ and $F_{PC}$; $M_B$, $F_{FB}$ and $F_{PBC}$ are fixed together, $M_C$ and $F_{PC}$ are fixed together, and $M_B$, $F_{PB}$ and $F_{PBC}$ as a whole are tightly combined with $M_C$ and $F_{PC}$ as a whole; after installation, $M_B$ and $F_{PB}$, and $F_{PBC}$ and $M_C$ respectively coincide with the perpendicular bisector of the ring surface of $F_{PC}$; the circles with radii of $r_{FBI}=r_M+a_{MBC}/2$ and $R_{FBO}=R_M-b_{MBC}/2$ below the ring-shaped magnetic conductive plate $F_{PB}$ are respectively provided thereon with chutes $O_{FBI}$%, $O_{FBO}$% of which the cross sections are in small semicircle shape;

the center shaft $A_M$ of such form also has high permeability; a bearing taking $A_M$ as a shaft is fixed in the position of $h_{AF}$ in height of the center shaft $A_M$, the ring-shaped magnetic conductive plate $F_{ABI}$ with radius of $r_{MBC}\%=r_M+a_{MBC}-\varepsilon_{FBC}$ is fixed onto the bearing, where at the part of $r\leq r_M-\varepsilon_{FBC}$, the thickness of $F_{ABI}$ is $d_{BC}$, and at the part of $r_M-\varepsilon_{FBC}\leq r\leq r_M+a_{MBC}-\varepsilon_{FBC}$, the thickness of $F_{ABI}$ is $d_{BC}\%=d_{BC}-2h_{MBC}-h_{OFB}-\varepsilon_{FBC}$; a chute $O_{FBI}$ matching the chute $O_{FBI}$% is arranged on the circle with radius of $r_{FBI}=r_M+a_{MBC}/2$ above $F_{ABI}$, wherein the total thickness is $h_{OFB}$ after $O_{FBI}$ and $O_{FBI}$% are combined together, and $\varepsilon_{FBC}\ll r_M$ represents clearance; a bracket Y is fixed onto the bottom plate P of the generator, and the ring-shaped magnetic conductive plate $F_{ABO}$ is fixed onto the bracket Y; the inner ring radius and outer ring radius of $F_{ABO}$ are $R_{FBI}=R_M-R_{MBC}$, $R_{FBO}=R_M+c_{MBC}$, respectively, at the part of $R\geq R_M+\varepsilon_{FBC}$, the thickness of $F_{ABO}$ is $d_{BC}$, and at the part of $R_M+\varepsilon_{FBC}\geq R\geq R_M-b_{MBC}+\varepsilon_{FBC}$, the thickness of $F_{ABO}$ is $d_{BC}\%$; a chute $O_{FBO}$ matching the chute $O_{FBO}\%$ is arranged on the circle with radius of $R_{FB}=R_M-b_{MBC}/2$ above $F_{ABO}$, wherein the total thickness is $h_{OFB}$ after $O_{FBO}$ and $O_{FBO}\%$ are combined together; in the parts with thickness of $d_{BC}$ close to the magnets on $F_{ABO}$ and $F_{ABI}$, i.e. $R\sim R_M+2\varepsilon_{FBC}$ and $r\sim r_M-2\varepsilon_{FBC}$ regions, ring planes perpendicular to $F_{ABO}$ and $F_{ABI}$ are respectively provided with n holes through which insulated conducting wires can pass;

three, four or six rotating shafts $Z_W$ are fixed onto the circle with radius of $R_{AW}=R_M+R_W>R_{FBO}=R_M+C_B$ on the bottom plate P; two identical drive wheels $W_A$, $W_B$ with radius of $R_W$ are respectively installed in the positions corresponding to the magnets $M_A$, $M_B$ on $Z_W$; the drive wheel $W_A$ is tangential to and in close contact with the outer ring of $M_A$, $W_B$ is tangential to and in close contact with the outer ring of $M_B$, and no conducting wire passes through in the position where $W_B$ is tangential to $M_B$; $M_A$ drives $W_A$, $W_B$ to rotate at the same linear velocity when rotating, and $W_B$ drives $M_B$ to rotate the same linear velocity;

a ring-shaped conducting wire bracket $G_{FBC}$ is fixed around the magnets $M_B$, $M_C$ through the holes of $F_{ABO}$ and $F_{ABI}$, the side surface radius of the outer ring of $G_{FBC}$ is $R_G=R_M+2\varepsilon_{FBC}$, the side surface radius of the inner ring is $r_G=r_M-2\varepsilon_{FBC}$, both the top frame $G_2$ and the bottom frame $G_1$ are ring planes, the inner radius and outer radius thereof are respectively identical to the side surface radius of the inner ring and the side surface radius of the outer ring, both the distance from $G_1$ to the bottom surface of $M_C$ and the distance from $G_2$ to the top surface of $M_B$ are $\varepsilon_{FBC}$; the conducting wire bracket $G_{FBC}$ is provided thereon with a conducting wire which twines through the holes of $F_{ABO}$ and $F_{ABI}$, and the two ends of the conducting wire are respectively connected to the wiring posts 1 and 2; no conducting wire is twined in the positions where the drive wheels $W_A$, $W_B$ are tangential to $M_A$, $M_B$ respectively; and the center shaft $A_M$ is driven by power, and DC electromotive force is generated at the two ends of the conducting wire.

13. The DC generator of claim 12, wherein the conducting wires between the magnets $M_A$, $M_B$ and between $M_C$, $M_D$ are replaced with conducting strips, corresponding conducting wire brackets are replaced with conducting strip brackets, the conducting strips are stationary, but the magnets rotate;

2n conducting strips $D_j$, j=1, 2 ... 2n which are identical to the magnets in ring surface and having the thickness of $h_P$ are uniformly arranged on the conducting wire brackets between the magnets $M_A$, $M_B$, the $2^{nd}$, the $4^{th}$ ... the $2n^{th}$ conducting strips are uniformly arranged on the conducting strip brackets between the magnets $M_C$, $M_D$, and the vertical center lines of all conducting strips coincide with the vertical center lines of the magnets; the outer circle edge of the conducting strip $D_1$ is connected to the first wiring post, the inner circle edge of $D_1$ is connected to the inner circle edge of $D_2$ by a conducting wire passing through the first hole of the ring-shaped magnetic conductive plate $F_{ABI}$, the outer circle edge of $D_2$ is connected to the outer circle edge of $D_3$ by a conducting wire passing through the first hole of the magnetic conductive plate $F_{ABO}$, the inner circle edge of $D_3$ is connected to the inner circle edge of $D_4$ by a conducting wire passing through the second hole of $F_{ABI}$, and so on, the inner circle edge of $D_{2n-1}$ is connected to the inner circle edge of $D_{2n}$ by a conducting wire passing through the $n_{th}$-hole of the magnetic conductive plate $F_{ABI}$, and the outer circle edge of $D_{2n}$ is connected to the second wiring post by a conducting wire; no conducting wire passes through in the position where the drive wheel $W_B$ is tangential to the magnet $M_B$, and $W_A$, $W_B$ can be in close contact with $M_A$, $M_B$ respectively and rotate simultaneously; and when the center shaft $A_M$ is driven to rotate by power, the magnets $M_A$, $M_B$, $M_C$, $M_D$ rotate at the same angular velocity as $A_M$, 2n serial conducting strips perform relative motion of cutting the magnetic line of force relative to the magnets, and DC electromotive force is generated.

14. The DC generator of claim 1, wherein the magnets used in the generator are permanent magnets or electromagnets; the electromagnet consists of an excitation coil and an iron core.

\* \* \* \* \*